(12) United States Patent
Imamura et al.

(10) Patent No.: US 10,071,727 B2
(45) Date of Patent: Sep. 11, 2018

(54) CONTROL SYSTEM FOR VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 15/465,734

(22) Filed: Mar. 22, 2017

(65) Prior Publication Data

US 2017/0282901 A1 Oct. 5, 2017

(30) Foreign Application Priority Data

Mar. 30, 2016 (JP) ................. 2016-069633

(51) Int. Cl.
*B60L 9/00* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01); *B60W 30/188* (2013.01); *F02D 41/005* (2013.01); *F02D 41/0007* (2013.01); *F02D 41/107* (2013.01); *F02D 41/3005* (2013.01); *B60W 2510/0628* (2013.01); *B60W 2510/0666* (2013.01); *B60W 2510/08* (2013.01); *B60W 2710/06* (2013.01); *B60W 2710/0633* (2013.01); *F02D 2200/025* (2013.01); *F02D 2200/0406* (2013.01); *F02D 2200/1004* (2013.01); *Y02T 10/128* (2013.01);
(Continued)

(58) Field of Classification Search
CPC combination set(s) only.
See application file for complete search history.

(56) References Cited

U.S. PATENT DOCUMENTS

| 2008/0196406 | A1* | 8/2008 | Kuzuyama | ..................... | 60/604 |
| 2011/0276251 | A1* | 11/2011 | Kang | ............................ | 701/103 |
| 2013/0166176 | A1* | 6/2013 | Nakada | ................... | F02D 45/00 |
| | | | | | 701/103 |

FOREIGN PATENT DOCUMENTS

| JP | 2004-176688 A | 6/2004 |
| JP | 2006-009736 A | 1/2006 |

(Continued)

*Primary Examiner* — Redhwan K Mawari
(74) *Attorney, Agent, or Firm* — Oliff PLC

(57) ABSTRACT

A control system for a vehicle includes an electronic control unit. The electronic control unit is configured to i) calculate a target supercharging pressure of an intake air such that, when an internal combustion engine is operated through the homogeneous charge compression ignition, the internal combustion engine achieves a required output while satisfying a predetermined requirement, ii) control an output of the internal combustion engine such that the output approaches the required output in accordance with an actual supercharging pressure in process of changing the actual supercharging pressure to the target supercharging pressure that is achieved by a supercharger, and iii) control a rotary machine such that an output of the rotary machine compensates for part or all of a differential output between the required output and the output in process of changing the actual supercharging pressure to the target supercharging pressure.

10 Claims, 9 Drawing Sheets

(51) Int. Cl.
*B60W 10/06* (2006.01)
*B60W 10/08* (2006.01)
*B60W 30/188* (2012.01)
*F02D 41/00* (2006.01)
*F02D 41/10* (2006.01)
*F02D 41/30* (2006.01)

(52) U.S. Cl.
CPC .............. *Y02T 10/144* (2013.01); *Y02T 10/47* (2013.01); *Y10S 903/93* (2013.01)

(56) References Cited

FOREIGN PATENT DOCUMENTS

| | | |
|---|---|---|
| JP | 2008-202520 A | 9/2008 |
| JP | 2011-168200 A | 9/2011 |
| JP | WO2012/032618 A1 | 3/2012 |
| JP | 2015-148179 A | 8/2015 |

\* cited by examiner

| DRIVE MODE | | | | C1 | B1 | MG1 | MG2 |
|---|---|---|---|---|---|---|---|
| EV | FORWARD TRAVELING/ BACKWARD TRAVELING | ONE-MOTOR | DRIVE | | | G | M |
| | | | WITH ENGINE BRAKE | △ | △ | G | M |
| | | TWO-MOTOR | | ○ | ○ | M | M |
| HV | FORWARD TRAVELING | HIGH GEAR | | | ○ | G | M |
| | | LOW GEAR | | ○ | | G | M |
| | BACKWARD TRAVELING | LOW GEAR | | ○ | | G | M |

○ : ENGAGED   △ : EITHER ONE IS ENGAGED WHEN ENGINE BRAKE IS USED
G : MAINLY GENERATOR   M : MAINLY MOTOR; HOWEVER, GENERATOR DURING REGENERATION

CONTROL SYSTEM FOR VEHICLE

INCORPORATION BY REFERENCE

The disclosure of Japanese Patent Application No. 2016-069633 filed on Mar. 30, 2016 including the specification, drawings and abstract is incorporated herein by reference in its entirety.

BACKGROUND

1. Technical Field

The present disclosure relates to a control system for a vehicle including an internal combustion engine that is able to perform homogeneous charge compression ignition operation, a supercharger, and a rotary machine that is able to transmit power to a drive wheel.

2. Description of Related Art

There is well known a vehicle including an internal combustion engine (hereinafter, referred to as HCCI engine) that is able to perform homogeneous charge compression ignition (HCCI) operation (hereinafter, referred to as HCCI operation) and a supercharger that supercharges intake air into the HCCI engine. This is, for example, a vehicle described in Japanese Patent Application. Publication No. 2008-202520 (JP 2008-202520 A). JP 2008-202520 A describes that, in the HCCI engine, abnormal combustion called knocking or preignition occurs in a high load operating region, and the HCCI engine is configured to be stably operated by inhibiting abrupt combustion at a high load with the use of supercharging or external exhaust gas recirculation (EGR) in order to prevent such abnormal combustion.

SUMMARY

Incidentally, supercharging has a delay in response. For this reason, if a supercharging pressure is increased to a target supercharging pressure so as to inhibit abnormal combustion in the HCCI engine in changing the HCCI engine to a high load side by, for example, increasing fuel, it may not be possible to appropriately inhibit abnormal combustion in a period until the supercharging pressure becomes the target supercharging pressure. Alternatively, if the supercharging pressure is decreased to a target supercharging pressure so as to inhibit a misfire in the HCCI engine in changing the HCCI engine toward a low load side by, for example, reducing fuel, it may not be possible to appropriately inhibit a misfire in a period until the supercharging pressure becomes the target supercharging pressure.

The present disclosure provides a control system for a vehicle, which is able to appropriately handle a delay in response at the time of changing a supercharging pressure in achieving a required output of the HCCI engine.

An aspect of the present disclosure provides a control system for a vehicle. The vehicle includes an internal combustion engine, a supercharger, a power transmission system, and a rotary machine. The internal combustion engine is configured to perform homogeneous charge compression ignition operation. The supercharger is configured to supercharge intake air into the internal combustion engine. The power transmission system is configured to transmit a power of the internal combustion engine to a drive wheel of the vehicle. The rotary machine is coupled to the drive wheel so as to transmit a power to the drive wheel. The control system includes an electronic control unit. The electronic control unit is configured to i) calculate a target supercharging pressure of the intake air such that, when the internal combustion engine is operated through the homogeneous charge compression ignition, the internal combustion engine achieves a required output of the internal combustion engine while satisfying a predetermined requirement, ii) control an output of the internal combustion engine such that the output of the internal combustion engine approaches the required output in accordance with an actual supercharging pressure in process of changing the actual supercharging pressure to the target supercharging pressure that is achieved by the supercharger, and iii) control the rotary machine such that an output of the rotary machine compensates for part or all of a differential output between the required output and the output of the internal combustion engine in process of changing the actual supercharging pressure to the target supercharging pressure. The electronic control unit may be configured to control the output of the internal combustion engine such that the output of the internal combustion engine approaches the required output while the predetermined requirement is satisfied in accordance with the actual supercharging pressure in process of changing the actual supercharging pressure to the target supercharging pressure that is achieved by the supercharger. The electronic control unit may be configured to control a fuel injection amount of the internal combustion engine such that the output of the internal combustion engine approaches the required output while the predetermined requirement is satisfied in accordance with the actual supercharging pressure in process of changing the actual supercharging pressure to the target supercharging pressure that is achieved by the supercharger.

With the control system according to this aspect, although a delay in response occurs at the time of changing the supercharging pressure, the output of the HCCI engine is controlled toward the required output in accordance with the actual supercharging pressure in process of changing the actual supercharging pressure to the target supercharging pressure that satisfies the predetermined requirement at the time when the HCCI engine is operated through the HCCI. Therefore, in comparison with the case where the output of the HCCI engine is changed toward the required output without consideration of a delay in response of the supercharging pressure, the HCCI engine is placed in an operating state where knocking, a misfire, or the like, is difficult to occur. In addition, since the output of the rotary machine compensates for part or all of the differential output between the required output and the output of the HCCI engine in process of changing the actual supercharging pressure to the target supercharging pressure, the required output is easy to be achieved with the use of the HCCI engine and the rotary machine. Thus, in achieving the required output of the HCCI engine, it is possible to appropriately deal with a delay in response at the time of changing the supercharging pressure.

In the control system according to the above aspect, the predetermined requirement may be a requirement for reducing knocking associated with an increase in the output of the internal combustion engine at the time when the internal combustion engine is operated through the homogeneous charge compression ignition.

With the control system according to this aspect, the predetermined requirement is a requirement for reducing knocking associated with an increase in the output of the HCCI engine at the time when the HCCI engine is operated through the HCCI. Therefore, the HCCI engine is placed in an operating state where knocking is easy to occur as a result of an attempt to increase the output of the HCCI engine in order to achieve the required output of the HCCI engine in a state where there is a delay in response to the target supercharging pressure that satisfies the predetermined requirement. In contrast, the HCCI engine is placed in an operating state where knocking is difficult to occur as a result of control over the output of the HCCI engine toward the required output in accordance with the actual supercharging pressure in process of changing the actual supercharging pressure to the target supercharging pressure.

In the control system according to the above aspect, the predetermined requirement may be a requirement for reducing a misfire associated with a reduction in the output of the internal combustion engine at the time when the internal combustion engine is operated through the homogeneous charge compression ignition.

With the control system according to this aspect, the predetermined requirement is a requirement for reducing a misfire associated with a reduction in the output of the HCCI engine at the time when the HCCI engine is operated through the HCCI. Therefore, the HCCI engine is placed in an operating state where a misfire is easy to occur due to an excessive amount of air as a result of an attempt to reduce the output of the HCCI engine in order to achieve the required output of the HCCI engine in a state where there is a delay in response to the target supercharging pressure that satisfies the predetermined requirement. In contrast, the HCCI engine is placed in an operating state where a misfire is difficult to occur as a result of control over the output of the HCCI engine toward the required output in accordance with the actual supercharging pressure in process of changing the actual supercharging pressure to the target supercharging pressure.

In the control system according to the above aspect, the vehicle may include an exhaust gas recirculation device configured to recirculate part of exhaust gas, flowing through an exhaust passage of the internal combustion engine, to an intake passage of the internal combustion engine. The electronic control unit may be configured to calculate a target exhaust gas recirculation rate of the exhaust gas recirculation device on the basis of the target supercharging pressure. The electronic control unit may be configured to control the output of the internal combustion engine such that the output of the internal combustion engine approaches the required output in accordance with the actual supercharging pressure and an actual exhaust gas recirculation rate in process of changing the actual exhaust gas recirculation rate to the target exhaust gas recirculation rate that is achieved by the exhaust gas recirculation device.

With the control system according to this aspect, since the output of the HCCI engine is controlled toward the required output in accordance with the actual supercharging pressure and the actual exhaust gas recirculation rate that is achieved by the exhaust gas recirculation device, the exhaust gas recirculation rate having a higher response than the supercharging pressure is changed while the HCCI engine is placed in an operating state where knocking, a misfire, or the like, is difficult to occur, so it is possible to change the output of the HCCI engine toward the required output earlier. Thus, it is possible to reduce the output of the rotary machine in compensation, so consumption of electric power is reduced.

In the control system according to the above aspect, the electronic control unit may be configured to, at the time when the required output of the internal combustion engine is changed as a result of a change in required driving output of the vehicle through driver's operation, control the rotary machine such that the output of the rotary machine compensates for the differential output between the required output and the output of the internal combustion engine.

With the control system according to this aspect, a driver tends to experience a feeling of strangeness unless actual driving force always changes similarly in response to driver's operation for changing a required driving output. Therefore, the output of the rotary machine compensates for the differential output at the time when the required output of the HCCI engine is changed as a result of a change in the required driving output through driver's operation, so it is possible to reduce a feeling of strangeness that is experienced by the driver.

In the control system according to the above aspect, the electronic control unit may be configured to, at the time when the required output of the internal combustion engine is changed as a result of a change of a request from a hybrid system regarding an operation of the internal combustion engine, control the rotary machine such that the output of the rotary machine compensates for the differential output between the required output and the output of the internal combustion engine.

With the control system according to this aspect, the driver tends to experience a feeling of strangeness if actual driving force changes as a result of a change of a request from the hybrid system, which is not caused by driver's operation. Therefore, the output of the rotary machine compensates for the differential output at the time when the required output of the HCCI engine is changed as a result of a change of a request from the hybrid system, so it is possible to reduce a feeling of strangeness that is experienced by the driver.

In the control system according, to the above aspect, the vehicle may include an electrical storage device configured to exchange electric power with the rotary machine, and the request from the hybrid system regarding the operation of the internal combustion engine may be a request to charge the electrical storage device.

With the control system according to this aspect, the driver tends to experience a feeling of strangeness if actual driving force decreases as a result of a delay of an increase in the output of the HCCI engine due to a delay in response of the supercharging pressure in increasing the required output of the HCCI engine in response to a request to charge the electrical storage device, which is not caused by driver's operation. Since the output of the rotary machine compensates for an insufficient amount of output, which is the differential output between the required output and the output of the HCCI engine, at the time when the required output of the HCCI engine is increased in response to a request to charge the electrical storage device, it is possible to reduce a feeling of strangeness that is experienced by the driver.

In the control system according to the above aspect, the power transmission system may include a transmission device that is provided between the internal combustion engine and the rotary machine and that has a shift function. The electronic control unit may be configured to control a shift of the transmission device. The electronic control unit may be configured to, when the output of the rotary machine compensates for the differential output, restrict a shift of the transmission device.

With the control system according to this aspect, when the transmission device is shifted, a driving force based on the differential output between the required output and the output of the HCCI engine changes, and an output that is generated by the rotary machine in compensation also changes, so there is a possibility that the changed output falls outside the outputtable range of the rotary machine and, as a result, drivability decreases. However, since a shift of the transmission device is restricted at the time when the output of the rotary machine compensates for the differential output between the required output and the output of the HCCI engine, it is possible to operate the rotary machine within the outputtable range.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings.

Figure 1:
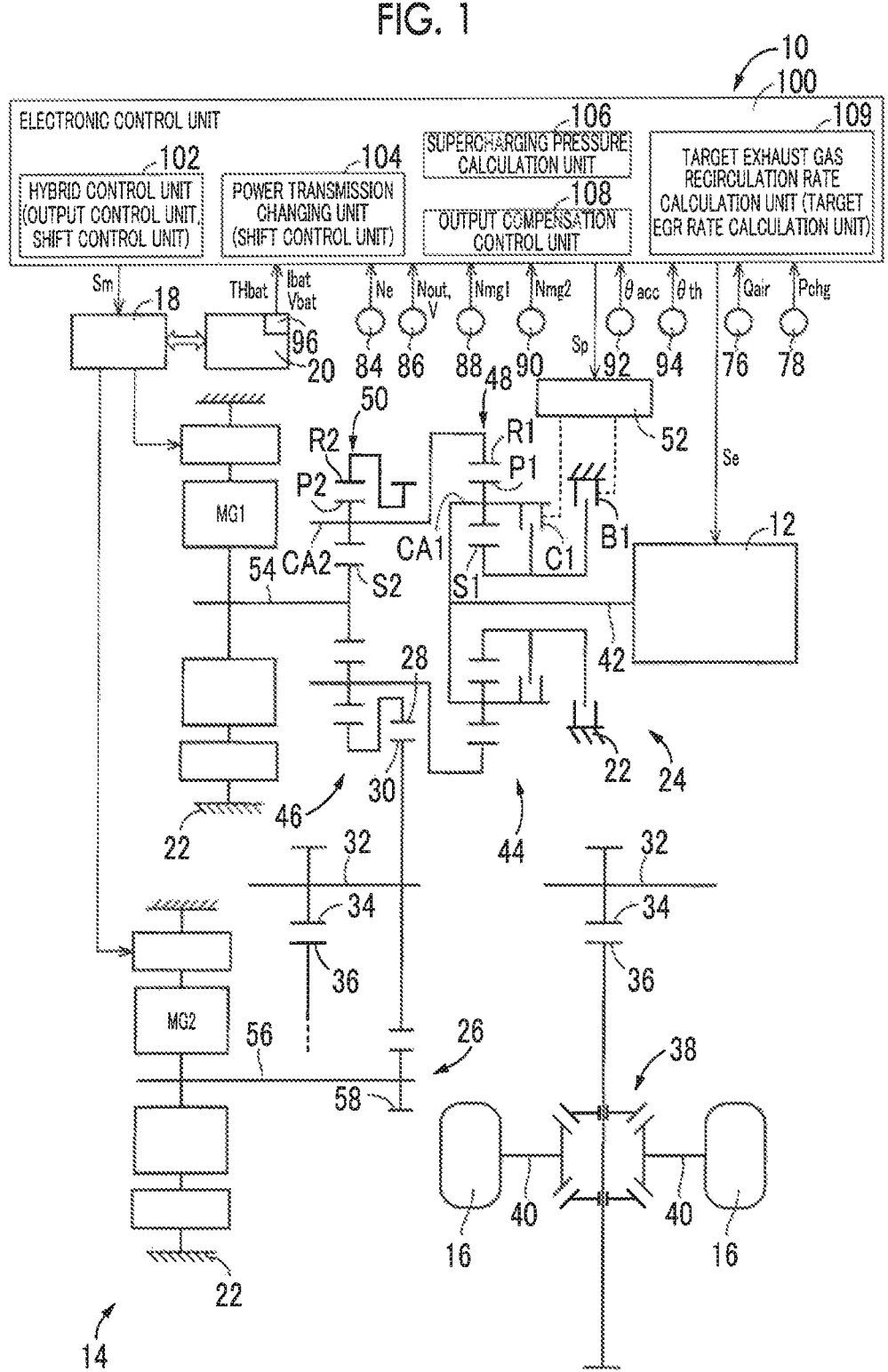
FIG. 1 is a view that illustrates the schematic configuration of parts regarding traveling of a vehicle to which the present disclosure is applied, and is a view that illustrates a relevant portion of control system for controlling the parts.

FIG. 1 is a view that illustrates the schematic configuration of parts regarding traveling of a vehicle 10 to which the present disclosure is applied and is a view that illustrates a relevant portion of control system for controlling the parts. As shown in FIG. 1, the vehicle 10 is a hybrid vehicle including an HCCI engine 12, a first electric rotary machine MG1, a second electric rotary machine MG2, a power transmission system 14 and drive wheels 16. The HCCI engine 12, the first electric rotary machine MG1 and the second electric rotary machine MG2 can serve as driving force sources for propelling the vehicle 10.

The HCCI engine 12 is an internal combustion engine (engine) that is able to perform homogeneous charge compression ignition (HCCI) operation for causing a lean premixture to perform self-ignition combustion. Since the HCCI engine 12 is able to perform lean premixture combustion under, for example, a sufficiently high-compression ratio condition, higher efficiency and cleaner engine-out emissions are expected. When an operating region suitable for HCCI operation is narrow in the HCCI engine 12, it is also possible to employ a mode in which the HCCI operation and an operation through spark ignition (SI) (hereinafter, referred to as SI operation) are changed as needed in response to the operating region. The operating status of the HCCI engine 12 is electrically controlled by an electronic control unit 100, with the result that the rotation speed (hereinafter, referred to as engine rotation speed Ne) and output torque (hereinafter, referred to as engine torque Te) of the HCCI engine 12 are controlled.

Each of the first electric rotary machine MG1 and the second electric rotary machine MG2 is a so-called motor generator having the function of an electric motor (motor) that generates driving torque and the function of a power generator (generator). Each of the first electric rotary machine MG1 and the second electric rotary machine MG2 is connected to a battery unit 20 via a power control unit 18. The power control unit 18 includes an inverter, a smoothing capacitor, and the like, and is provided in the vehicle 10. The battery unit 20 is provided in the vehicle 10. The power control unit 18 is controlled by the electronic control unit 100 (described later), so an MG1 torque Tmg1 that is an output torque (motoring torque or regenerative torque) of the first electric rotary machine MG1 and an MG2 torque Tmg2 that is an output torque (motoring torque or regenerative torque) of the second electric rotary machine MG2 are controlled.

The power transmission system 14 is provided in the power transmission path between the HCCI engine 12 and the drive wheels 16. The power transmission system 14 is accommodated inside a case 22 together with the first electric rotary machine MG1 and the second electric rotary machine MG2. The case 22 is a non-rotating member mounted on a vehicle body. The power transmission system 14 includes a first power transmission unit 24, a second power transmission unit 26, a driven gear 30, a driven Shaft 32, a final gear 34 (which has a smaller diameter than the driven gear 30), a differential gear 38, axles 40, and the like. The driven gear 30 is in mesh with a drive gear 28. The drive gear 28 is an output rotating member of the first power transmission unit 24. The driven gear 30 is fixed to the driven shaft 32 so as to be relatively non-rotatable. The final gear 34 is fixed to the driven shaft 32 so as to be relatively non-rotatable. The differential gear 38 is in mesh with the final gear 34 via a differential ring gear 36. The axles 40 are coupled to the differential gear 38.

The first power transmission unit 24 is arranged coaxially with an input shaft 42 that is an input rotating member of the first power transmission unit 24, and includes a transmission unit 44 and a differential unit 46. The transmission unit 44 includes a first planetary gear mechanism 48, a clutch C1 and a brake B1. The differential unit 46 includes a second planetary gear mechanism 50.

The first planetary gear mechanism 48 is a known single-pinion planetary gear mechanism. The first planetary gear mechanism 48 includes a first sun gear S1, first pinion gears P1, a first carrier CA1 and a first ring gear R1. The first carrier CA1 supports the first pinion gears P1 such that each first pinion gear P1 is rotatable and revolvable. The first ring gear R1 is in mesh with the first sun gear S1 via the first pinion gears P1. The first planetary gear mechanism 48 serves as a differential mechanism that provides differential action. The first planetary gear mechanism 48 is an input-side differential mechanism arranged on the HCCI engine 12 side with respect to the second planetary gear mechanism 50. The first carrier CA1 is a rotating element (for example, first rotating element RE1) that is integrally coupled to the input shaft 42 and to which the HCCI engine 12 is coupled via the input shaft 42 such that power is transmittable. The first carrier CA1 serves as an input rotating member of the transmission unit 44. The first sun gear S1 is a rotating element (for example, second rotating element RE2) that is selectively coupled to the case 22 via the brake B1. The first ring gear R1 is a rotating element (for example, third rotating element RE3) that is coupled to an input rotating member of the differential unit 46 (that is, a second carrier CA2 of the second planetary gear mechanism 50). The first ring gear R1 serves as an output rotating member of the transmission unit 44. The first carrier CA1 and the first sun gear S1 are selectively coupled to each other via the clutch C1.

Each of the clutch C1 and the brake B1 is suitably a wet-type friction engaging device, and is a multi-disc hydraulic friction engaging device of which an engaging operation is controlled by a hydraulic actuator. The operation statuses (such as an engaged state and a released state) of the clutch C1 and brake B1 are controlled in response to hydraulic pressures (for example, hydraulic pressure Pc1 and hydraulic pressure Pb1) respectively supplied from a hydraulic control circuit 52, as a result of control over the hydraulic control circuit 52 by the electronic control unit 100 (described later). The hydraulic control circuit 52 is provided in the vehicle 10.

In a state where both the clutch C1 and the brake B1 are released, the differential motion of the first planetary gear mechanism 48 is permitted. Thus, in this state, the first sun gear S1 cannot provide a reaction torque against the engine torque Te, so the transmission unit 44 is placed in a neutral state where mechanical transmission of power is disabled. In a state where the clutch C1 is engaged and the brake B1 is released, the rotating elements of the first planetary gear mechanism 48 are integrally rotated. Thus, in this state, the rotation of the HCCI engine 12 is transmitted from the first ring gear R1 to the second carrier CA2 at a constant speed. On the other hand, in a state where the clutch C1 is released and the brake B1 is engaged, the rotation of the first sun gear S1 is stopped and the rotation of the first ring gear R1 is increased in speed from the rotation of the first carrier CA1 in the first planetary gear mechanism 48. Thus, in this state, the rotation of the HCCI engine 12 is increased in speed and output from the first ring gear R1. In this way, the transmission unit 44 serves as a two-speed stepped transmission that is changed between a low gear at which a direct-coupling state (Speed ratio=1.0) is established and a high gear at which an overdrive state (for example, Speed ratio=0.7) is established. In a state where both the clutch C1 and the brake B1 are engaged, the rotation of each of the rotating elements is stopped in the first planetary gear mechanism 48. Thus, in this state, the rotation of the first ring gear R1 that is the output rotating member of the transmission unit 44 is stopped, so the rotation of the second carrier CA2 that is the input rotating member of the differential unit 46 is stopped.

The second planetary gear mechanism 50 is a known single-pinion planetary gear mechanism. The second planetary gear mechanism 50 includes a second sun gear S2, second pinion gears P2, the second carrier CA2 and a second ring gear R2. The second carrier CA2 supports the second pinion gears P2 such that each second pinion gear P2 is rotatable and revolvable. The second ring gear R2 is in mesh with the second sun gear 82 via the second pinion gears P2. The second planetary gear mechanism 50 serves as a differential mechanism that provides differential action. The second planetary gear mechanism 50 is an output-side differential mechanism arranged on the drive wheels 16 side with respect to the first planetary gear mechanism 48. The second carrier CA2 is a rotating element (for example, first rotating element RE1) that is an input element coupled to the output rotating member of the transmission unit 44 (that is, the first ring gear R1 of the first planetary gear mechanism 48). The second carrier CA2 serves as an input rotating member of the differential unit 46. The second sun gear S2 is a rotating element (for example, second rotating element RE2) that is a reaction element integrally coupled to a rotor shaft 54 of the first electric rotary machine MG1 and to which the first electric rotary machine MG1 is coupled such that power is transmittable. The second ring gear R2 is a rotating element (for example, third rotating element RE3) that is an output element integrally coupled to the drive gear 28 and coupled to the drive wheels 16. The second ring gear R2 serves as an output rotating member of the differential unit 46.

The second planetary gear mechanism 50 serves as a power distribution mechanism that distributes power, which is input to the second carrier CA2, between the first electric rotary machine MG1 and the second ring gear R2. That is, in the differential unit 46, not only mechanically transmission of power that is distributed to the second ring gear R2, but also a power distributed to the first electric rotary machine MG1 for causing the first electric rotary machine MG1 to generate electric power, and the generated electric power is stored or the second electric rotary machine MG2 is driven by using the electric power. Thus, the differential unit 46 serves as a known electrical differential unit (electrical continuously variable transmission) that controls the speed ratio through control over the power control unit 18 by the electronic control unit 100 (described later) to control the operation status of the first electric rotary machine MG1. That is, the differential unit 46 includes the second planetary gear mechanism 50 and the first electric rotary machine MG1. The second planetary gear mechanism 50 serves as a differential mechanism coupled to the HCCI engine 12 such that power is transmittable. The first electric rotary machine MG1 serves as a differential rotary machine coupled to the second planetary gear mechanism 50 such that power is transmittable. The differential unit 46 is an electrical transmission mechanism in which the differential status of the second planetary gear mechanism 50 is controlled as a result of control over the operation status of the first electric rotary machine MG1.

In the thus configured first power transmission unit 24, the power of the HCCI engine 12 and the power of the first electric rotary machine MG1 are transmitted from the drive gear 28 to the driven gear 30. Therefore, the HCCI engine 12 and the first electric rotary machine MG1 are coupled to the drive wheels 16 via the first power transmission unit 24 such that power is transmittable. Since the transmission unit 44 is in the overdrive state, an increase in the torque of the first electric rotary machine MG1 is reduced.

The second power transmission unit 26 includes a rotor shaft 56 of the second electric rotary machine MG2 and a reduction gear 58 (which has a smaller diameter than the driven gear 30). The rotor shaft 56 is arranged parallel to the input shaft 42 separately from the input shaft 42. The reduction gear 58 is in mesh with the driven gear 30 and is coupled to the rotor shaft 56. Thus, in the second power transmission unit 26, the power of the second electric rotary machine MG2 is transmitted to the driven gear 30 without passing through the first power transmission unit 24. Therefore, the second electric rotary machine MG2 is a rotary machine coupled to the drive wheels 16 such that power is transmittable without passing through the first power transmission unit 24.

The thus configured power transmission system 14 is suitably used for a front-engine front-drive (FF) vehicle. In the power transmission system 14, the power of the HCCI engine 12, the power of the first electric rotary machine MG1 or the power of the second electric rotary machine MG2 is transmitted to the driven gear 30, and is transmitted from the driven gear 30 to the drive wheels 16 via the final gear 34, the differential gear 38, the axles 40, and the like, sequentially. In the power transmission system 14, the HCCI engine 12, the first power transmission unit 24 and the first electric rotary machine MG1 are arranged along the axis different from the axis along which the second electric rotary machine MG2 is arranged, so the axial length is reduced. In addition, the reduction ratio of the second electric rotary machine MG2 is allowed to be increased.

The power control unit 18 is controlled by the electronic control unit 100 (described later) such that an output torque required of the first electric rotary machine MG1 and an output torque required of the second electric rotary machine MG2 are obtained. Thus, the power control unit 18 controls an exchange of electric power associated with the operations of the first electric rotary machine MG1 and second electric rotary machine MG2. The battery unit 20 includes a battery, and the like. The battery is a chargeable and dischargeable secondary battery, such as a lithium ion battery pack and a nickel metal-hydride battery pack. The battery unit 20 is an electrical storage device that exchanges electric power with each of the first electric rotary machine MG1 and the second electric rotary machine MG2 via the power control unit 18.

Figure 2:
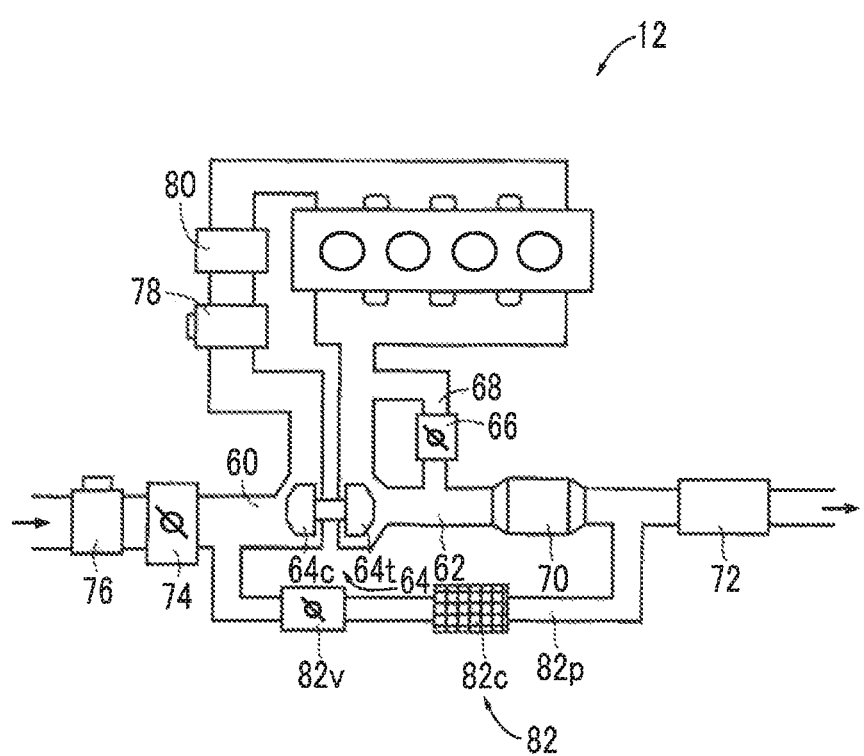
FIG. 2 is a view that illustrates the schematic configuration of an intake system and exhaust system of an HCCI engine.

FIG. 2 is a view that illustrates the schematic configuration of an intake system and exhaust system of the HCCI engine 12. As shown in FIG. 2, an intake passage (which is synonymous with intake pipe) 60 is connected to the intake system of the HCCI engine 12, and an exhaust passage (which is synonymous with exhaust pipe) 62 is connected to the exhaust system of the HCCI engine 12. The HCCI engine 12 includes a turbocharger (hereinafter, referred to as supercharger 64) that is a known exhaust turbo-supercharger. The supercharger 64 includes a compressor wheel 64c and a turbine wheel 64t. The compressor wheel 64c is provided inside the intake passage 60. The turbine wheel 64t is provided inside the exhaust passage 62. The turbine wheel 64t is driven to rotate by the flow of exhaust gas. The compressor wheel 64c is coupled to the turbine wheel 64t. The compressor wheel 64c is driven to rotate by the turbine wheel 64t, and compresses (supercharges) intake air into the HCCI engine 12.

An exhaust bypass passage 68 is provided in parallel with the exhaust passage 62. A waste gate valve 66 is provided in the exhaust bypass passage 68. The exhaust bypass passage 68 bypasses the turbine wheel 64t by flowing exhaust gas upstream of the turbine wheel 64t to a portion downstream of the turbine wheel 64t. The opening degree of the waste gate valve 66 is continuously adjusted as a result of, for example, control over an actuator (not shown) by the electronic control unit 100 (described later). Thus, the ratio between exhaust gas passing through the turbine wheel 64t and exhaust gas passing through the exhaust bypass passage 68 is continuously controlled. For example, as the opening degree of the waste gate valve 66 increases, exhaust gas from the HCCI engine 12 becomes easier to be emitted through the exhaust bypass passage 68. Therefore, in a supercharging state of the HCCI engine 12 where the supercharging action of the supercharger 64 functions, a supercharging pressure Pchg of the supercharger 64, which is an atmospheric pressure downstream of the compressor wheel 64c inside the intake passage 60, decreases as the opening degree of the waste gate valve 66 increases. A start converter 70 is provided in the exhaust passage 62 downstream of a portion to which the exhaust bypass passage 68 downstream of the waste gate valve 66 is connected. An aftertreatment device 72 is provided in the exhaust passage 62 downstream of the start converter 70.

An electronic throttle valve 74 is provided in the intake passage 60 upstream of the compressor wheel 64c. The open or closed state of the electronic throttle valve 74 is controlled by a throttle actuator (not shown). An air flow meter 76 is provided in the intake passage 60 upstream of the electronic throttle valve 74. The air flow meter 76 measures an intake air amount Qair of the HCCI engine 12. A supercharging pressure sensor 78 and an intercooler 80 are provided in the intake passage 60 downstream of the compressor wheel 64c. The supercharging pressure sensor 78 detects the pressure (supercharging pressure Pchg) of intake air compressed (pressurized) by the supercharger 64. The intercooler 80 is a heat exchanger that cools intake air compressed by the supercharger 64 by exchanging heat between intake air and outside air or coolant.

The HCCI engine 12 includes an exhaust gas recirculation device (EGR device) 82. The EGR device 82 recirculates part of exhaust gas, circulating through the exhaust passage 62, to the intake passage 60 at a low pressure. The EGR device 82 includes an EGR passage 82p, an EGR cooler 82c and an EGR valve 82v. The EGR passage 82p connects the exhaust passage 62 downstream of the start converter 70 and upstream of the aftertreatment device 72 to the intake passage 60 upstream of the compressor wheel 64c and downstream of the electronic throttle valve 74. Exhaust gas is recirculated at a low pressure through the EGR passage 82p. The opening degree (opening amount) of the EGR valve 82v is adjusted as a result of, for example, control over an actuator (not shown) in response to a valve opening degree command from the electronic control unit 100 (described later). Thus, an exhaust gas recirculation amount (exhaust gas recycling amount, EGR amount) that is the amount of exhaust gas that is recirculated (that is, the amount of exhaust gas that is recycled) is controlled, and an exhaust gas recirculation rate (exhaust gas recycling rate, EGR rate) (=EGR amount/Inflow air) that expresses an EGR amount with respect to inflow air (=Intake air amount+EGR amount) is controlled. In the HCCI engine 12, for example, occurrence of knocking is reduced or production of NOx is reduced by operating the EGR device 82.

Referring back to FIG. 1, the vehicle 10 includes the electronic control unit 100 including a controller that controls various parts regarding traveling. The electronic control unit 100 includes a so-called microcomputer including, for example, a CPU, a RAM, a RUM, input/output interfaces, and the like. The CPU executes signal processing in accordance with programs prestored in the ROM while utilizing a temporary storage function of the RAM, thus executing various controls over the vehicle 10. For example, the electronic control unit 100 is configured to execute output control over the HCCI engine 12, the first electric rotary machine MG1 and the second electric rotary machine MG2, control for changing the drive mode (described later), and the like. Where necessary, the electronic control unit 100 is divided into an engine control electronic control unit, an electric rotary machine control electronic control unit, a hydraulic control electronic control unit, and the like.

Various signals based on detected values of various sensors, and the like, provided in the vehicle 10 are supplied to the electronic control unit 100. The various sensors include, for example, an engine rotation speed sensor 84, an output rotation speed sensor 86, an MG1 rotation speed sensor 88, such as a resolver, an MG2 rotation speed sensor 90, such as a resolver, an accelerator operation amount sensor 92, a throttle valve opening degree sensor 94, the air flow meter 76, the supercharging pressure sensor 78, a battery sensor 96, and the like. The various signals include, for example, an engine rotation speed Ne, an output rotation speed Nout that is the rotation speed of the driven gear 30 corresponding to a vehicle speed V, an MG1 rotation speed Nmg1, an MG2 rotation speed Nmg2, an accelerator operation amount θacc, a throttle opening degree θth that is the opening degree of the electronic throttle valve 74, an intake air amount Qair of the HCCI engine 12, a supercharging pressure Pchg that is the pressure (intake air pressure) of intake air compressed by the supercharger 64, a battery temperature THbat, battery charge/discharge current Ibat and battery voltage Vbat of the battery unit 20, and the like. Various command signals are supplied from the electronic control unit 100 to devices provided in the vehicle 10. The devices include, for example, the HCCI engine 12, the power control unit 18, the hydraulic control circuit 52, and the like. The various command signals include, for example, an engine control command signal Se, a rotary machine control command signal Sm, a hydraulic control command signal Sp, and the like. The electronic control unit 100 calculates a state of charge (charged capacity) SOC of the battery unit 20 on the basis of, for example, the battery charge/discharge current Ibat, the battery voltage Vbat, and the like.

The electronic control unit 100 includes hybrid control means, that is, a hybrid control unit 102, and power transmission changing means, that is, a power transmission changing unit 104, in order to implement control functions for various controls in the vehicle 10.

The hybrid control unit 102 executes output control over the HCCI engine 12 such that a target engine torque Te is obtained by outputting the engine control command signal Se for controlling the open/closed state of the electronic throttle valve and controlling the fuel injection amount and injection timing. The hybrid control unit 102 executes output control over the first electric rotary machine MG1 or the second electric rotary machine MG2 such that a target MG1 torque Tmg1 or a target MG2 torque Tmg2 is obtained by outputting the rotary machine control command signal Sm for controlling the operation of the first electric rotary machine MG1 or second electric rotary machine MG2 to the power control unit 18.

The hybrid control unit 102 calculates a driving output (driving power) that is required of the vehicle 10 through driver's operation (that is, a required driving output (required driving power) of the vehicle 10 through driver's operation) by applying the accelerator operation amount θacc and the vehicle speed V to a relationship (for example, driving power map (not shown) that is obtained empirically or by design and stored in advance (that is, predetermined).

The hybrid control unit 102 generates an output (power) for achieving the required driving power from at least one of the HCCI engine 12, the first electric rotary machine MG1 and the second electric rotary machine MG2 such that an operation with less exhaust gas emissions at low fuel consumption is achieved in consideration of a required charging value (required charging power), or the like. The required charging value is a request to charge the battery unit 20, which is a request from a hybrid system regarding the operation of the HCCI engine 12. In this way, the hybrid control unit 102 serves as an output control unit that controls the output of each of the HCCI engine 12, the first electric rotary machine MG1 and the second electric rotary machine MG2 such that a required output (required power) of each of the HCCI engine 12, the first electric rotary machine MG1 and the second electric rotary machine MG2 for achieving the required driving power is generated.

The hybrid control unit 102 selectively establishes a motor drive mode (EV drive mode) or a hybrid drive mode (HV drive mode) as the drive mode in response to a traveling status. The EV drive mode is a control mode in which motor driving (EV driving) that uses at least one of the first electric rotary machine MG1 and the second electric rotary machine MG2 as a driving force source for propelling the vehicle 10 in a state where the operation of the HCCI engine 12 is stopped is enabled. The HV drive mode is a control mode in which engine driving that uses at least the HCCI engine 12 as a driving force source for propelling the vehicle 10 (that is, the vehicle 10 travels by transmitting the power of the HCCI engine 12 to the drive wheels 16) is enabled.

When the required driving power (for example, the required driving torque at the vehicle speed V at that time) falls within a motor driving region smaller than a predetermined threshold, the hybrid control unit 102 establishes the EV drive mode; whereas, when the required driving torque falls within an engine driving region larger than or equal the predetermined threshold, the hybrid control unit 102 establishes the HV drive mode. Even when the EV drive mode is established but, for example, when the charged capacity SOC is lower than a predetermined threshold or when a warm-up of the HCCI engine 12 is required, the hybrid control unit 102 operates the HCCI engine 12.

When the EV drive mode is established, the hybrid control unit 102 establishes a one-motor EV mode in the case where the required driving torque is provided by only the second electric rotary machine MG2; whereas the hybrid control unit 102 establishes a two-motor EV mode in the case where the required driving torque is not provided by only the second electric rotary machine MG2. The hybrid control unit 102 enables EV driving that uses only the second electric rotary machine MG2 as a driving force source for propelling the vehicle 10 in the case where the one-motor EV mode is established; whereas the hybrid control unit 102 enables EV driving that uses both the first electric rotary machine MG1 and the second electric rotary machine MG2 as driving force sources for propelling the vehicle 10 in the case where the two-motor EV mode is established. Even when the required driving torque is provided by only the second electric rotary machine MG2 but when the operating point of the second electric rotary machine MG2, which is expressed by the MG2 rotation speed Nmg2 and the MG2 torque Tmg2, falls within a predetermined region as an operating point that deteriorates the efficiency of the second electric rotary machine MG2 (in other words, when the efficiency in the case where both the first electric rotary machine MG1 and the second electric rotary machine MG2 are used is higher), the hybrid control unit 102 establishes the two-motor EV mode. When the two-motor EV mode is established, the hybrid control unit 102 causes the first electric rotary machine MG1 and the second electric rotary machine MG2 to share the required driving torque on the basis of the operation efficiency of the first electric rotary machine MG1 and the operation efficiency of the second electric rotary machine MG2.

When the HV drive mode is established, the hybrid control unit 102 enables engine driving by transmitting an engine direct torque to the drive gear 28 with the use of a reaction force against the power of the HCCI engine 12 through power generation of the first electric rotary machine MG1 and transmitting a torque to the drive wheels 16 as a result of driving the second electric rotary machine MG2 with electric power generated by the first electric rotary machine MG1. That is, when the HV drive mode is established, the hybrid control unit 102 enables engine driving where the vehicle 10 travels by transmitting the power of the HCCI engine 12 to the drive wheels 16 through control over the operation status of the first electric rotary machine MG1. In this engine driving, the hybrid control unit 102 operates the HCCI engine 12 at an engine operating point (that is, an engine operating point expressed by the engine rotation speed Ne and the engine torque Te) in consideration of a known optimal fuel consumption line of the HCCI engine 12. The hybrid control unit 102 outputs the rotary machine control command signal Sm to the power control unit 18 such that the differential unit 46 serves as the electrical continuously variable transmission by controlling the speed ratio through control over the operation status of the first electric rotary machine MG1. Since the speed ratio of the first power transmission unit 24 (by extension, the speed ratio of the power transmission system 14) is changed by shifting the speed of the differential unit 46, the hybrid control unit 102 serves as a shift control unit that controls a shift of the differential unit 46. The differential unit 46 serves as a transmission device having a speed change function, provided between the HCCI engine 12 and the second electric rotary machine MG2. In the HV drive mode, the vehicle 10 is also able to travel by further using the driving torque of the second electric rotary machine MG2, added with the use of electric power from the battery unit 20.

The power transmission changing unit 104 controls engaging operations of the clutch C1 and brake B1 on the basis of the drive mode established by the hybrid control unit 102. The power transmission changing unit 104 outputs the hydraulic control command signal Sp for engaging and/or releasing each of the clutch C1 and the brake B1 to the hydraulic control circuit 52 in order to allow transmission of power for traveling in the drive mode established by the hybrid control unit 102.

Figures 3, 4:
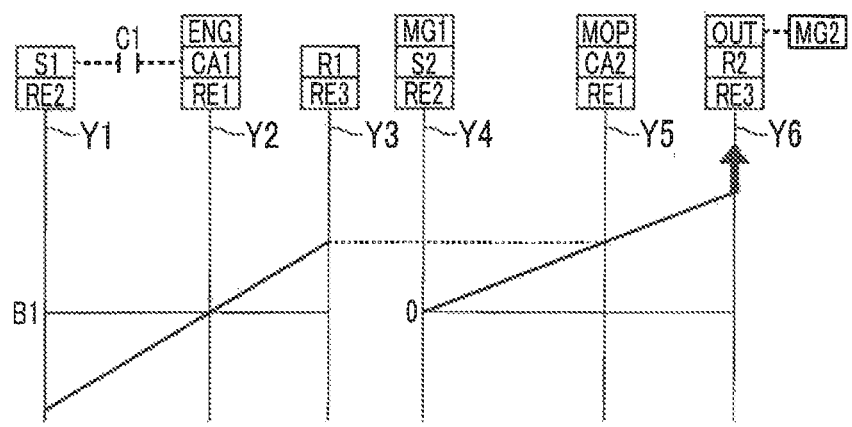
FIG. 3 is a chart that shows the engaging operation of each engaging device in each drive mode.
FIG. 4 is a nomograph in one-motor EV mode.

The drive modes that are allowed to be performed by the vehicle 10 will be described with reference to FIG. 3, and FIG. 4 to FIG. 7. FIG. 3 is a chart that shows the operation status of each of the clutch C1 and the brake B1 in each drive mode. In the chart of FIG. 3, a circle mark indicates an engaged state of the corresponding engaging device (C1, B1), a blank indicates a released state, and a triangle mark indicates that either one of the engaging devices is engaged at the time when engine brake that places the nonoperating HCCI engine 12 in a co-rotation state is also used. In addition, "G" indicates that the first electric rotary machine MG1 is mainly caused to serve as a generator, "M" indicates that the rotary machine (MG1, MG2) is mainly caused to serve as a motor when the rotary machine (MG1, MG2) is driven and is mainly caused to serve as a generator when the rotary machine (MG1, MG2) performs regeneration. As shown in FIG. 3, the vehicle 10 is able to selectively execute the EV drive mode and the HV drive mode. The EV drive mode includes two modes, that is, the one-motor EV mode and the two-motor EV mode.

FIG. 4 to FIG. 7 are nomographs that relatively show the rotation speeds of the three rotating elements RE1, RE2, RE3 in each of the first planetary gear mechanism 48 and the second planetary gear mechanism 50. In these nomographs, vertical lines Y1 to Y3 represent the rotation speeds of the rotating elements in the first planetary gear mechanism 48. In order from the left side when facing toward the sheet, the vertical line Y1 represents the rotation speed of the first sun gear S1 that is the second rotating element RE2 that is selectively coupled to the case 22 via the brake B1, the vertical line Y2 represents the rotation speed of the first carrier CA1 that is the first rotating element RE1 coupled to the HCCI engine 12, and the vertical line Y3 represents the rotation speed of the first ring gear R1 that is the third rotating element RE3 coupled to the second carrier CA2. Vertical lines Y4 to Y6 represent the rotation speeds of the rotating elements in the second planetary gear mechanism 50. In order from the left side when facing toward the sheet, the vertical line Y4 represents the rotation speed of the second sun gear S2 that is the second rotating element RE2 coupled to the first electric rotary machine MG1, the vertical line Y5 represents the rotation speed of the second carrier CA2 that is the first rotating element RE1 coupled to the first ring gear R1, and the vertical line Y6 represents the rotation speed of the second ring gear R2 that is the third rotating element RE3 coupled to the drive gear 28.

Figure 5:
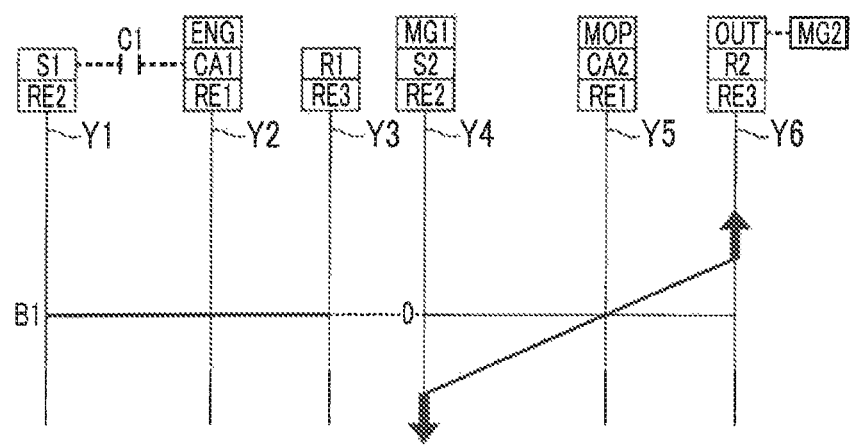
FIG. 5 is a nomograph in two-motor EV mode.

FIG. 4 is a nomograph in the one-motor EV mode. As shown in FIG. 3, the one-motor EV mode is achieved in a state where both the clutch C1 and the brake B1 are released. Since the clutch C1 and the brake B1 are released in the one-motor EV mode as shown in FIG. 4, the differential motion of the first planetary gear mechanism 48 is permitted, and the transmission unit 44 is placed in the neutral state. When the transmission unit 44 is placed in the neutral state, the differential unit 46 is placed in a neutral state because a reaction torque against the MG1 torque Tmg1 is not provided by the second carrier CA2 coupled to the first ring gear R1. Therefore, the first power transmission unit 24 is placed in a neutral state by releasing the clutch C1 and the brake B1. In this state, the hybrid control unit 102 causes the second electric rotary machine MG2 to output the MG2 torque Tmg2 for propelling the vehicle 10. At the time when the vehicle 10 travels backward, the second electric rotary machine MG2 is rotated in the reverse direction in contrast to the operation at the time when the vehicle 10 travels forward. While the vehicle 10 is traveling, the second ring gear R2 coupled to the drive gear 28 is rotated in synchronization with the rotation of the drive Wheels 16 in the one-motor EV mode, the rotation of the second carrier CA2 may be set to zero rotation (for example, the state as shown in the nomograph of FIG. 5) by, for example, causing the first electric rotary machine MG1 to rotate at idle; however, in order to reduce a drag loss, and the like, in the first electric rotary machine MG1, the hybrid control unit 102 keeps the MG1 rotation speed Nmg1 at zero. For example, the hybrid control unit 102 keeps the MG1 rotation speed Nmg1 at zero under feedback control by causing the first electric rotary machine MG1 to serve as a generator. Alternatively, the hybrid control unit 102 keeps the MG1 rotation speed Nmg1 at zero by executing control for supplying current to the first electric rotary machine MG1 such that the rotation of the first electric rotary machine MG1 is fixed (d-axis lock control). Alternatively, when the MG1 rotation speed Nmg1 is kept at zero by the cogging torque of the first electric rotary machine MG1 even when the MG1 torque Tmg1 is set to zero, it is not required to add the MG1 torque Tmg1. Even when control for keeping the MG1 rotation speed Nmg1 at zero has been executed, the first power transmission unit 24 is in the neutral state, so the driving torque is not influenced.

In the one-motor EV mode, the first ring gear R1 is co-rotated with the second carrier CA2; however, the transmission unit 44 is in the neutral state, so the HCCI engine 12 is not co-rotated but placed in a stopped state at zero rotation. Thus, when regenerative control is executed over the second electric rotary machine MG2 while the vehicle 10 is traveling in the one-motor EV mode, a large amount of regenerative electric power is allowed to be acquired. When the battery unit 20 becomes a full charge state and cannot store regenerative energy while the vehicle 10 is traveling in the one-motor EV mode, it is conceivable to additionally use engine brake. When engine brake is additionally used, the brake B1 or the clutch C1 is engaged as shown in FIG. 3. When the brake B1 or the clutch C1 is engaged, the HCCI engine 12 is placed in the co-rotation state, and engine brake is caused to function. By increasing the MG1 rotation speed Nmg1, it is possible to increase the engine rotation speed Ne in the co-rotation state of the HCCI engine 12. Since it is possible to increase the engine rotation speed Ne by engaging the brake B1 or the clutch C1, when the HCCI engine 12 is started in the EV drive mode, the HCCI engine 12 is started by increasing the engine rotation speed Ne with the use of the first electric rotary machine MG1 as needed in a state where the brake B1 or the clutch C1 is engaged. At this time, the second electric rotary machine MG2 is caused to additionally output a reaction force cancellation torque. In starting the HCCI engine 12 while the vehicle 10 is stopped, the engine rotation speed Ne may be increased by increasing the rotation of the second carrier CA2 with the use of the first electric rotary machine MG1 in a state where the brake B1 or the clutch C1 is engaged. Alternatively, the engine rotation speed Ne may be increased by increasing the rotation of the second carrier CA2 with the use of the first electric rotary machine MG1 and then engaging the brake B1 or the clutch C1.

FIG. 5 is a nomograph in the two-motor IN mode. As shown in FIG. 3, the two-motor EV mode is achieved in a state where the clutch C1 and the brake B1 are engaged. As shown in FIG. 5, the clutch C1 and the brake B1 are engaged in the two-motor EV mode, so the differential motion of the first planetary gear mechanism 48 is restricted, and the rotation of the first sun gear S1 is stopped. For this reason, the rotation of each of the rotating elements of the first planetary gear mechanism 48 is stopped. Thus, the HCCI engine 12 is placed in the stopped state at zero rotation, and the rotation of the second carrier CA2 coupled to the first ring gear R1 is also stopped. When the rotation of the second carrier CA2 is stopped, a reaction torque against the MG1 torque Tmg1 is provided by the second carrier CA2, so it is possible to cause the second ring gear R2 to mechanically output the MG1 torque Tmg1 and transmit the MG1 torque Tmg1 to the drive wheels 16. Therefore, by engaging the clutch C1 and the brake B1, the first power transmission unit 24 is placed in a non-neutral state where mechanical transmission of power is possible. The hybrid control unit 102 causes the first electric rotary machine MG1 and the second electric rotary Machine MG2 to respectively output the MG1 torque Tmg1 and MG2 torque Tmg2 for propelling the vehicle 10. In the two-motor EV mode, backward traveling is possible by rotating both the first electric rotary machine MG1 and the second electric rotary machine MG2 in the reverse direction in contrast to the operation at the time when the vehicle 10 travels forward.

Figure 6:
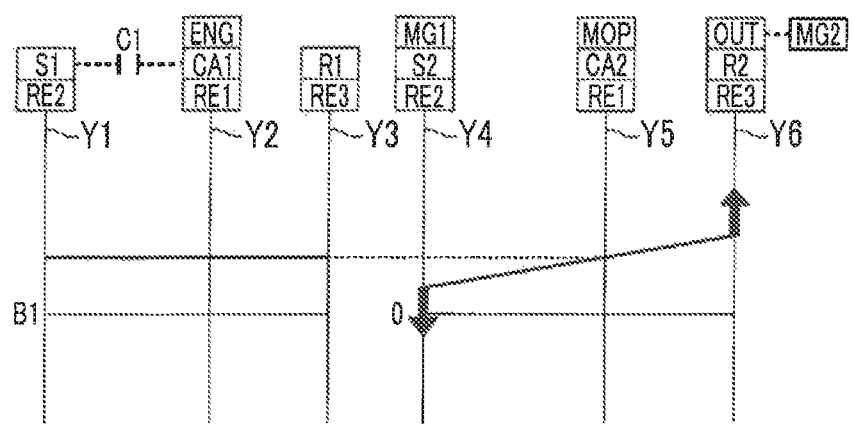
FIG. 6 is a nomograph in a low gear state in HV drive mode.

FIG. 6 is a nomograph in the low gear state in the HV drive mode. As shown in FIG. 3, the low gear state in the HV drive mode is achieved in a state where the clutch C1 is engaged and the brake 131 is released. As shown in FIG. 6, since the clutch C1 is engaged in low gear state in the HV drive mode, the differential motion of the first planetary gear mechanism 48 is restricted, and the rotating elements of the first planetary gear mechanism 48 are integrally rotated. That is, the transmission unit 44 is placed in a direct-coupling state. For this reason, the rotation of the HCCI engine 12 is transmitted from the first ring gear R1 to the second carrier CA2 at a constant speed.

Figure 7:
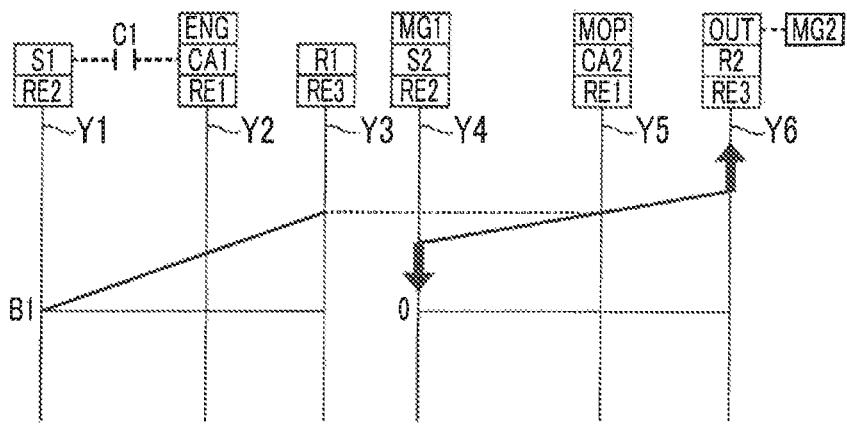
FIG. 7 is a nomograph in a high gear state in the HV drive mode.

FIG. 7 is a nomograph in the high gear state in the HV drive mode. As shown in FIG. 3, the high gear state in the drive mode is achieved in a state where the brake B1 is engaged and the clutch C1 is released. As shown in FIG. 7, since the brake B1 is engaged in the high gear state in the HV drive mode, the rotation of the first sun gear S1 is stopped. That is, the transmission unit 44 is placed in the overdrive (O/D) state. For this reason, the rotation of the HCCI engine 12 is increased in speed and is transmitted from the first ring gear R1 to the second carrier CA2.

In the HV drive mode, it is possible to cause the second ring gear R2 to mechanically output part of the engine torque Te (engine direct torque) and transmit the part of the engine torque Te to the drive wheels 16 by providing a reaction force against the power of the HCCI engine 12 with the use of the first electric rotary machine MG1. Therefore, by engaging the clutch C1 or the brake B1, the first power transmission unit 24 is placed in the non-neutral state where mechanical transmission of power is possible. The hybrid control unit 102 causes the first electric rotary machine MG1 to generate electric power to output the MG1 torque Tmg1 that is a reaction torque against the engine torque Te, and causes the second electric rotary machine MG2 to output the MG2 torque Tmg2 with the use of the electric power generated by the first electric rotary machine MG1. In the low gear state in the HV drive mode, backward traveling is possible by rotating the second electric rotary machine MG2 in the reverse direction in contrast to the operation at the time when the vehicle 10 travels forward.

Figure 8:
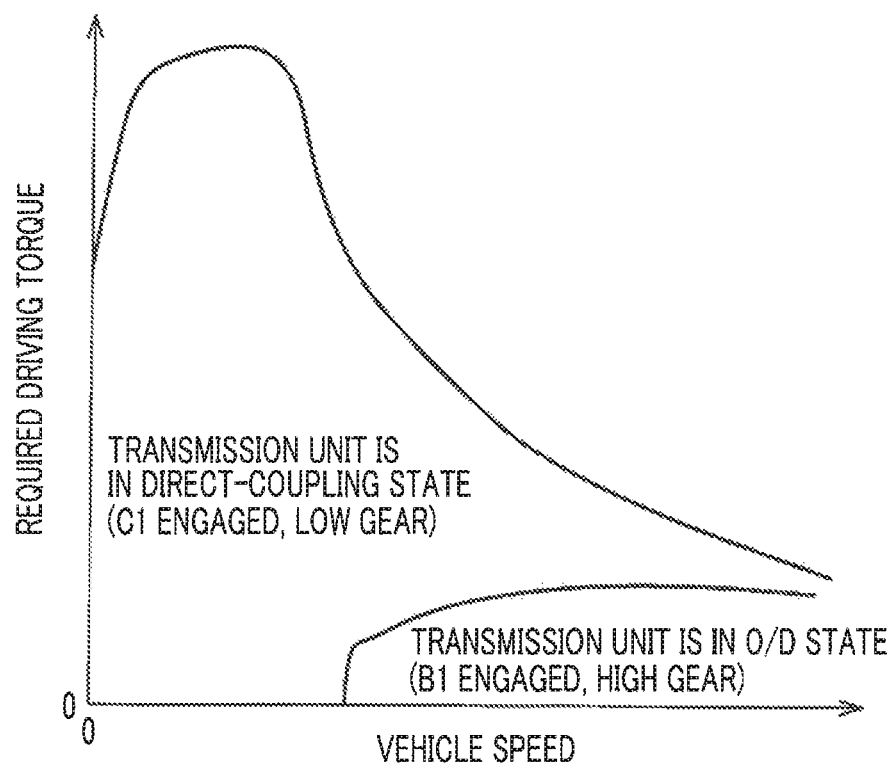
FIG. 8 is a graph that shows an example of a predetermined relationship having boundary lines for changing a transmission status.

When the HV drive mode is established, the hybrid control unit 102 applies the vehicle speed. V and the required driving torque to, for example, a relationship (transmission status changing map) having predetermined boundary lines using the vehicle speed V and the required driving torque as variables as shown in FIG. 8, establishes the low gear state in the HV drive mode at the time when the status of the vehicle 10 falls within a region in which the transmission unit 44 is set to low gear, and establishes the high gear state in the HV drive mode when the status of the vehicle 10 falls within a region in which the transmission unit 44 is set to high gear. The power transmission changing unit 104 sets the transmission unit 44 to low gear by engaging the clutch C1 when the low gear state in the HV drive mode is established; whereas the power transmission changing unit 104 sets the transmission unit 44 to high gear by engaging the brake B1 when the high gear state in the HV drive mode is established. In this way, the power transmission changing unit 104 serves as a shift control unit that changes the transmission unit 44 between low gear and high gear. Since the speed ratio of the first power transmission unit 24 (by extension, the speed ratio of the power transmission system 14) is changed by shifting the transmission unit 44, the power transmission changing unit 104 serves as a shift control unit that controls a shift of the transmission unit 44. The transmission unit 44 serves as a transmission device having a speed change function, provided between the HCCI engine 12 and the second electric rotary machine MG2.

In a state of a so-called mechanical point at which the MG1 rotation speed Nmg1 is set to zero and the power of the HCCI engine 12 is entirely mechanically transmitted to the drive gear 28 without passing through an electrical path (an electrical power transmission path that is an electrical path related to an exchange of electric power to or from the first electric rotary machine MG1 or the second electric rotary machine MG2), a theoretical value of power transmission efficiency (theoretical transmission efficiency) of the differential unit 46 (Output power/Input power) is "1" that is the highest. This mechanical point is a state where the MG1 rotation speed Nmg1 is zero (that is, a state where the rotation speed of the second sun gear S2 is zero) in the differential unit 46 (see the vertical lines Y4 to Y6) in the nomographs of FIG. 6 and FIG. 7. There are two of the mechanical points since the high gear state (high gear) and the low gear state (low gear) are changed with each other in the HV drive mode, and the mechanical point increases toward a high vehicle speed side since the high gear state in the HV drive mode is provided, so high-speed fuel consumption improves.

In the first power transmission unit 24, the transmission unit 44 and the differential unit 46 are connected in series with each other. When the transmission unit 44 is shifted, the speed ratio of the first power transmission unit 24 is also changed. The hybrid control unit 102 shifts the differential unit 46 in synchronization with a shift of the transmission unit 44 by the power transmission changing unit 104 such that a change in the speed ratio of the first power transmission unit 24 is reduced at the time of a shift of the transmission unit 44. For example, when the transmission unit 44 is upshifted from low gear to high gear, the hybrid control unit 102 downshifts the differential unit 46 at the same time. Thus, the first power transmission unit 24 is caused to serve as a so-called electrical continuously variable transmission. Since the first power transmission unit 24 in which the transmission unit 44 and the differential unit 46 are connected in series with each other has a wide range of the speed ratio, it is possible to set a relatively large speed ratio of the power transmission path from the differential unit 46 to the drive wheels 16.

The rotation speed of the second carrier CA2 is increased with respect to the same engine rotation speed Ne in the high gear state in the HV drive mode as compared to the low gear state in the HV drive mode. This restricts a power circulation state where the first electric rotary machine MG1 enters a motoring state in negative rotation and negative torque at a high vehicle speed and, as a result, electric power is supplied to the first electric rotary machine MG1 in engine driving. By placing the transmission unit 44 in the O/D state at a high vehicle speed in the HV drive mode, it is possible to reduce the power loss of the power transmission system 14.

In the power transmission system 14, a mechanical oil pump for supplying working oil (oil) that is used for engaging operation of each of the clutch C1 and the brake B1, lubrication of parts and cooling of parts is coupled to the second carrier CA2 (see MOP in FIG. 4 to FIG. 7), and is driven with the rotation of the second carrier CA2. When the rotation of the second carrier CA2 is stopped as in the case of the two-motor EV mode, oil is supplied from an electrical oil pump (not shown).

As described above, the HCCI engine 12 has a narrow operating region suitable for HCCI operation. Particularly, in a high-load operating region, abrupt combustion or knocking can occur, so it is desirable to expand the operating region of HCCI operation by avoiding or reducing such knocking, or the like. It is possible to avoid or reduce abrupt combustion or knocking at a high load by rarefying a mixture (intake air and fuel) through supercharging of the supercharger 64 or decreasing a combustion temperature through EGR with the use of the EGR device 82.

Figure 9:
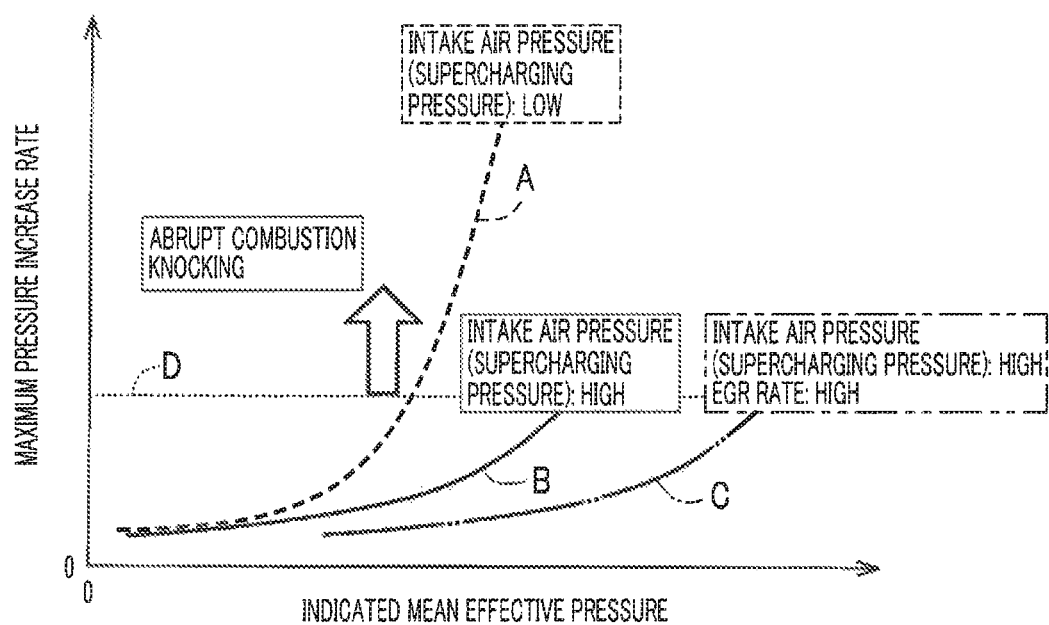
FIG. 9 is a graph that shows an example for illustrating the influence of supercharging and the influence of EGR on an operating region.

FIG. 9 is a graph for illustrating the influence of supercharging and the influence of EGR on the operating region. In FIG. 9, the abscissa axis represents indicated mean effective pressure, and the ordinate axis represents maximum pressure increase rate. The indicated mean effective pressure corresponds to a mean pressure at which combustion gas presses a piston, and is substantially proportional to the engine torque Te, so a side toward which the value increases is a high load side. A higher value of the maximum pressure increase rate indicates that combustion is abrupt, abrupt combustion or knocking occurs in a region in which the value of the maximum pressure increase rate exceeds dashed line D. Under a condition A that the supercharging pressure Pchg is low, indicated by wide dashed line A, the maximum pressure increase rate steeply increases with an increase in load. That is, under the condition A, the operation of the HCCI engine 12 in a high load-side region is restricted because of occurrence of abrupt combustion or knocking. On the other hand, under a condition B that the supercharging pressure Pchg is increased, indicated by continuous line, the value of the maximum pressure increase rate that does not exceed dashed line D is kept even in a region in which the load of the HCCI engine 12 is higher. That is, under the condition B, the operation of the HCCI engine 12 in the high load-side region is expanded as compared to the condition A. On the other hand, under a condition C that EGR is further added to the condition B, indicated by alternate long and two-short dashes line C, the operation of the HCCI engine 12 in the high load-side region is further expanded. In consideration of the above, the hybrid control unit 102 avoids or reduces knocking on the basis of the relationship between rarefication through supercharging and a change in maximum pressure increase rate such that the HCCI engine 12 is allowed to perform HCCI operation at a higher load. Knocking at the time when the HCCI engine 12 is placed in the high load-side region is described above; however, if the supercharging pressure Pchg is excessive at the time when the HCCI engine 12 is placed in a low load-side region (that is, at the time when the fuel injection amount is reduced), the amount of air is excessively large, so a misfire is easy to occur. For this reason, when the HCCI engine 12 is placed in the low load-side region, the supercharging pressure Pchg can be required to be reduced in order to avoid or reduce a misfire.

Incidentally, supercharging has a delay in response. For this reason, in changing the HCCI engine 12 to a high load side, if the fuel injection amount is increased in accordance with a required power of the HCCI engine 12 in a state where the supercharging pressure Pchg for reducing knocking has not been achieved, knocking can occur in a period of a delay in response of supercharging. In changing the HCCI engine 12 to a low load side, if the fuel injection amount is reduced in accordance with a required power of the HCCI engine 12 in a state where the supercharging pressure Pchg for reducing a misfire has not been achieved, a misfire can occur in a period of a delay in response of supercharging.

The electronic control unit 100 changes the output of the HCCI engine 12 (engine power Pe) in accordance with a delay in response of the supercharging pressure Pchg (that is, in response to an excess or deficiency of the supercharging pressure Pchg) during the transition in which the load of the HCCI engine 12 changes (that is, during the transition in which the required power of the HCCI engine 12 is changed). At this time, the engine power Pe changed in accordance with a delay in response of the supercharging pressure Pchg is larger or smaller than the required power of the HCCI engine 12. In contrast, the electronic control unit 100 uses the output of the second electric rotary machine MG2 (MG2 power Pmg2) in compensation for part or all of a differential output between the required power of the HCCI engine 12 and the engine power Pe changed in accordance with a delay in response of the supercharging pressure Pchg.

Since EGR is higher in response than supercharging, the electronic control unit 100 changes the EGR amount in compensation for a delay in response of supercharging, and increases the rate of change in the engine power Pe. Specifically, as shown in FIG. 9, when the case where the state of the condition A indicated by wide dashed line A is shifted into the state of the condition B indicated by continuous line B is compared with the case where the state of the condition A indicated by wide dashed line A is shifted into the state of the condition C indicated by alternate long and two-shoat dashes line, it is presumable that a time of a shift into each of the state of the condition B and the state of the condition C is substantially equal if the condition of the supercharging pressure Pchg having a low response is the same. Then, in changing into the condition of the same supercharging pressure Pchg, a time that takes until no knocking occurs at a certain required power (indicated mean effective pressure) is shorter in the latter case (the state of the condition C) where EGR is used. By utilizing this fact, the rate of change in the engine power Pe is increased by compensating for a delay in response of supercharging with the use of EGR. It is possible to reduce the MG2 power Pmg2 as compensation by the amount by Which the rate of change in the engine power Pe is increased. EGR increases the concentration of nitrogen in intake air, and does not feed the amount of air required for the required power of the HCCI engine 12, so only EGR cannot deal with a high output of the HCCI engine 12. For this reason, in control during the transition in which the required power of the HCCI engine 12 is changed, a change in the required power of the HCCI engine 12 is mainly dealt with by changing the supercharging pressure Pchg, and EGR is auxiliary used to increase the rate of change in the engine power Pe.

In order to implement the above-described function of control during the transition in which the required power of the HCCI engine 12 is changed, the electronic control unit 100 further includes supercharging pressure calculation means, that is, a supercharging pressure calculation unit 106, output compensation control means, that is, an output compensation control unit 108, and target exhaust gas recirculation rate calculation means, that is, a target exhaust gas recirculation rate calculation unit 109 (hereinafter, referred to as target EGR rate calculation unit 109).

When the HCCI engine 12 performs HCCI operation, the supercharging pressure calculation unit 106 calculates a target supercharging pressure Pchgtgt of intake air by which the required power of the HCCI engine 12 is achieved while a predetermined requirement is satisfied. Specifically, the predetermined requirement is a requirement for reducing knocking resulting from an increase in the output of the HCCI engine 12 when the HCCI engine 12 performs HCCI operation. That is, at the time of an increase in the required power of the HCCI engine 12, the supercharging pressure calculation unit 106 uses the characteristics shown in FIG. 9, and sets the target supercharging pressure Pchgtgt to the minimum value of the supercharging pressure Pchg at which knocking is avoided or reduced at the time when the required power is achieved. The predetermined requirement is a requirement for reducing a misfire resulting from a reduction in the output of the HCCI engine 12 when the HCCI engine 12 performs HCCI operation. That is, at the time of a reduction in the required power of the HCCI engine 12, the supercharging pressure calculation unit 106 uses a predetermined relationship (not shown) between an engine power Pe (fuel injection amount) and a supercharging pressure Pchg at which it is possible to avoid or reduce a misfire, and sets the target supercharging pressure Pchgtgt to the supercharging pressure Pchg at which a misfire is avoided or reduced at the time when the required power is achieved.

The hybrid control unit 102 controls the engine power Pe of the HCCI engine 12 toward the required power in accordance with an actual supercharging pressure Pchg in process of changing the actual supercharging pressure Pchg to the target supercharging pressure Pchgtgt that is achieved by the supercharger 64. That is, in transitional process of increasing the engine power Pe to the required power, the hybrid control unit 102 gradually increases the engine power Pe within the range in which knocking is avoided or reduced at an actual supercharging pressure Pchg in process of increasing the actual supercharging pressure Pchg to the target supercharging pressure Pchgtgt. In transitional process of reducing the engine power Pe to the required power, the hybrid control unit 102 gradually reduces the engine power Pe within the range in which a misfire is avoided or reduced at an actual supercharging pressure Pchg in process of reducing the actual supercharging pressure Pchg to the target supercharging pressure Pchgtgt.

The output compensation control unit 108 uses the MG2 power Pmg2 compensation for part or all of a differential output $\Delta Pe$ between the required power of the HCCI engine 12 and the actual engine power Pe in process of changing the actual supercharging pressure Pchg to the target supercharging pressure Pchgtgt (=Required power−Actual engine power Pe). Specifically, when the differential output $\Delta Pe$ is a positive value, the output compensation control unit 108 calculates a rotary machine compensation power as compensation for part or all of the differential output $\Delta Pe$ through motoring of the second electric rotary machine MG2, and outputs a command to cause the second electric rotary machine MG2 to output the rotary machine compensation power to the power control unit 18. When the differential output $\Delta Pe$ is a negative value, the output compensation control unit 108 calculates a rotary machine compensation power as compensation for part or all of the differential output $\Delta Pe$ through regeneration of the second electric rotary machine MG2, and outputs a command to cause the second electric rotary machine MG2 to generate the rotary machine compensation power to the power control unit 18.

It is presumable that a driver tends to experience a feeling of strangeness unless an actual driving force always changes similarly in response to driver's operation (for example, accelerator operation) for changing a required driving power of the vehicle 10. The output compensation control unit 108 uses the MG2 power Pmg2 in compensation for the differential output $\Delta Pe$ at the time when the required power of the HCCI engine 12 is changed as a result of a change in the required driving power of the vehicle 10 through driver's operation, which is calculated by the hybrid control unit 102.

It is presumable that the driver tends to experience a feeling of strangeness if an actual driving force changes as a result of a change in request from the hybrid system (for example, a required charging power as a request to charge the battery unit 20), which is not caused by driver's operation. Specifically; it is presumable that the driver tends to experience a feeling of strangeness if an actual driving force decreases as a result of a delay of an increase in the engine power Pe due to a delay in response of the supercharging pressure Pchg in increasing the required power of the engine 12 in response to a request to charge the battery unit 20, which is not caused by driver's operation. When the required power of the HCCI engine 12 has been changed as a result of a Change in request from the hybrid system regarding the operation of the HCCI engine 12, the output compensation control unit 108 uses the MG2 power Pmg2 in compensation for the differential output ΔPe.

In addition, when the EGR amount is allowed to be changed, the target EGR rate calculation unit 109 calculates a target EGR rate of the EGR device 82 on the basis of the target supercharging pressure Pchgtgt. Specifically, the target EGR rate calculation unit 109 calculates a variable EGR amount (hereinafter, referred to as EGR variation amount) in process of changing the supercharging pressure Pchg to the target supercharging pressure Pchgtgt on the basis of the operation status of the HCCI engine 12, and sets the EGR rate calculated on the basis of the EGR variation amount for a target EGR rate.

When the EGR amount is allowed to be changed, the hybrid control unit 102 controls the engine power Pe of the HCCI engine 12 toward the required power in accordance with an actual supercharging pressure Pchg in process of changing the actual supercharging pressure Pchg to the target supercharging pressure Pchgtgt that is achieved by the supercharger 64 and an actual EGR rate in process of changing the actual EGR rate to the target EGR rate that is achieved by the EGR device 82. That is, in transitional process of increasing the engine power Pe to the required power, the hybrid control unit 102 gradually increases the engine power Pe within the range in which knocking is avoided or reduced at an actual supercharging pressure Pchg in process of increasing the actual supercharging pressure Pchg to the target supercharging pressure Pchgtgt and an actual EGR rate in process of changing the actual EGR rate to the target EGR rate. In transitional process of reducing the engine power Pe to the required power, the hybrid control unit 102 gradually reduces the engine power Pe within the range in which a misfire is avoided or reduced at an actual supercharging pressure Pchg in process of reducing the actual supercharging pressure Pchg to the target supercharging pressure Pchgtgt and an actual EGR rate in process of changing the actual EGR rate to the target EGR rate.

When the transmission device (the transmission unit 44 and the differential unit 46) of the power transmission system 14 is shifted, a driving force based on the differential output ΔPe changes, and the MG2 power Pmg2 that is generated by the second electric rotary machine MG2 in compensation also changes. Therefore, there is a possibility that the changed MG2 power Pmg2 falls outside the outputtable range of the second electric rotary machine MG2 and, as a result, drivability decreases. When the output compensation control unit 108 uses the MG2 power Pmg2 in compensation for the differential output ΔPe, the hybrid control unit 102 or the power transmission changing unit 104 restricts a shift of the transmission device of the power transmission system 14. For example, the power transmission changing unit 104 prohibits a shift of the transmission unit 44. That is, even when the hybrid control unit 102 determines to change between the low gear state in the HV drive mode and the high gear state in the HV drive mode by referring to the transmission status changing map as shown in FIG. 8, the power transmission changing unit 104 does not immediately execute a shift of the transmission unit 44, but the power transmission changing unit 104 executes a shift after the HCCI operation of the HCCI engine 12 becomes stable. The hybrid control unit 102 prohibits a shift of the differential unit 46 or reduces a change in the speed ratio of the differential unit 46.

At the time of increasing the required power of the HCCI engine 12, it is possible to achieve the required power of the HCCI engine 12 by increasing the fuel injection amount without changing the supercharging pressure Pchg or the EGR rate up to a load at which no knocking occurs at an actual supercharging pressure Pchg or an actual EGR rate, so it is not required to perform compensation with the use of the second electric rotary machine MG2. At the time of reducing the required power of the HCCI engine 12, it is possible to achieve the required power of the HCCI engine 12 by reducing the fuel injection amount without changing the supercharging pressure Pchg or the EGR rate up to a load (fuel injection amount) at which no misfire occurs at an actual supercharging pressure Pchg or actual EGR rate, so it is not required to perform compensation with the use of the second electric rotary machine MG2.

The output compensation control unit 108 acquires an actual supercharging pressure Pchg detected by the supercharging pressure sensor 78. The output compensation control unit 108 calculates an EGR amount on the basis of a valve opening degree command of the electronic control unit 100 to the actuator of the EGR valve 82v, and calculates (acquires) an actual EGR rate on the basis of the EGR amount and the intake air amount Qair.

At the time of increasing the required power of the HCCI engine 12, the output compensation control unit 108 uses the characteristics as shown in FIG. 9, and calculates the maximum value of the indicated mean effective pressure at which no knocking occurs, that is, the amount of injectable fuel (hereinafter, fuel injectable amount) at which no knocking occurs, at the acquired actual supercharging pressure Pchg and actual EGR rate. At the time of reducing the required power of the HCCI engine 12, the output compensation control unit 108 uses a predetermined relationship (not shown) between an engine power Pe (fuel injection amount) and a supercharging pressure Pchg and FUR rate at which it is possible to avoid or reduce a misfire, and calculates a fuel injectable amount at which no misfire occurs at the acquired actual supercharging pressure Pchg and actual EGR rate.

The output compensation control unit 108 calculates a possible engine power. Pe (hereinafter, referred to as possible power) at the calculated fuel injectable amount. The output compensation control unit 108 calculates a power difference between the required power of the HCCI engine 12 and the possible power (=Required power−Possible power).

The output compensation control unit 108 determines whether the absolute value of the calculated power difference (|Power difference|) is larger than a predetermined value. When the output compensation control unit 108 determines that the absolute value of the power difference (|Power difference|) is smaller than or equal to the predetermined value, the output compensation control unit 108 does not calculate a rotary machine compensation power, and does not perform compensation with the use of the second electric rotary machine MG2 by setting the rotary machine compensation power to zero. In this case, the supercharging pressure calculation unit 106 does not calculate a target supercharging pressure Pchgtgt. On the other hand, when the output compensation control unit 108 determines that the absolute value of the power difference (|Power difference|) is larger than the predetermined value, the supercharging pressure calculation unit 106 calculates a target supercharging pressure Pchgtgt. The output compensation control unit 108 calculates a rotary machine compensation power, and performs compensation with the use of the second electric rotary machine MG2. The predetermined value is a predetermined threshold for determining that the power difference is a value to such an extent that, even when the supercharging pressure Pchg needs to be changed, it is allowed to determine that the necessity to compensate for a delay in response of the supercharging pressure Pchg with the use of the second electric rotary machine MG2 is small.

Figure 10:
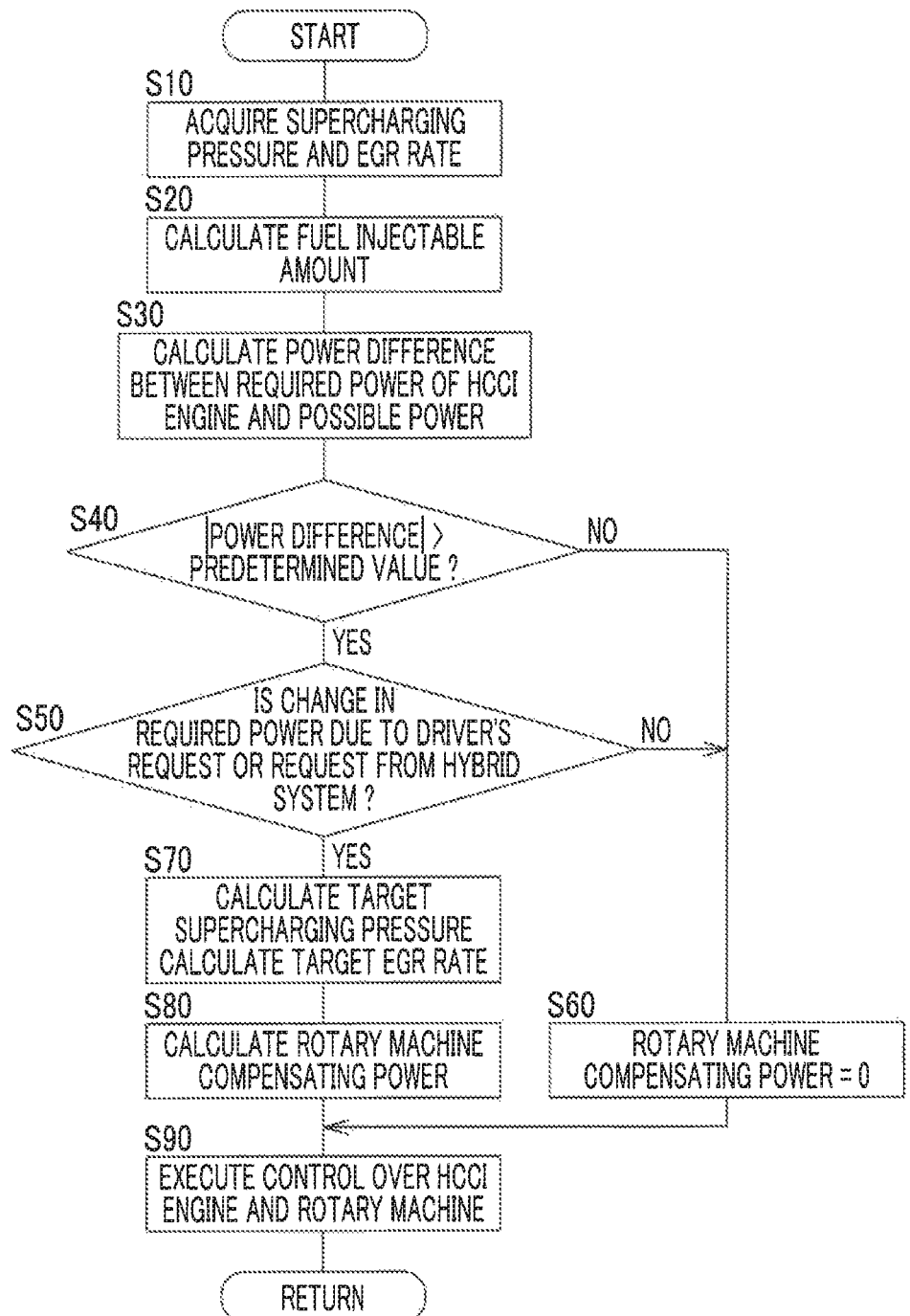
FIG. 10 is a flowchart that illustrates a relevant portion of control operations of an electronic control unit, that is, control operations for appropriately dealing with a delay in response at the time of changing a supercharging pressure in achieving a required output of the HCCI engine.
Figure 11:
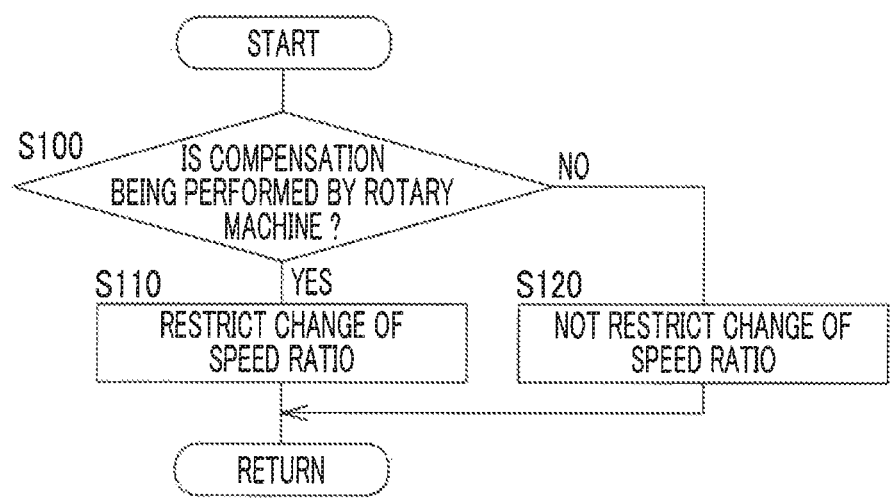
FIG. 11 is a flowchart that illustrates a relevant portion of control operations of the electronic control unit, that is, control operations for appropriately dealing with a delay in response at the time of changing the supercharging pressure in achieving the required output of the HCCI engine, and is executed in parallel with the flowchart of FIG. 10.
Figure 12:
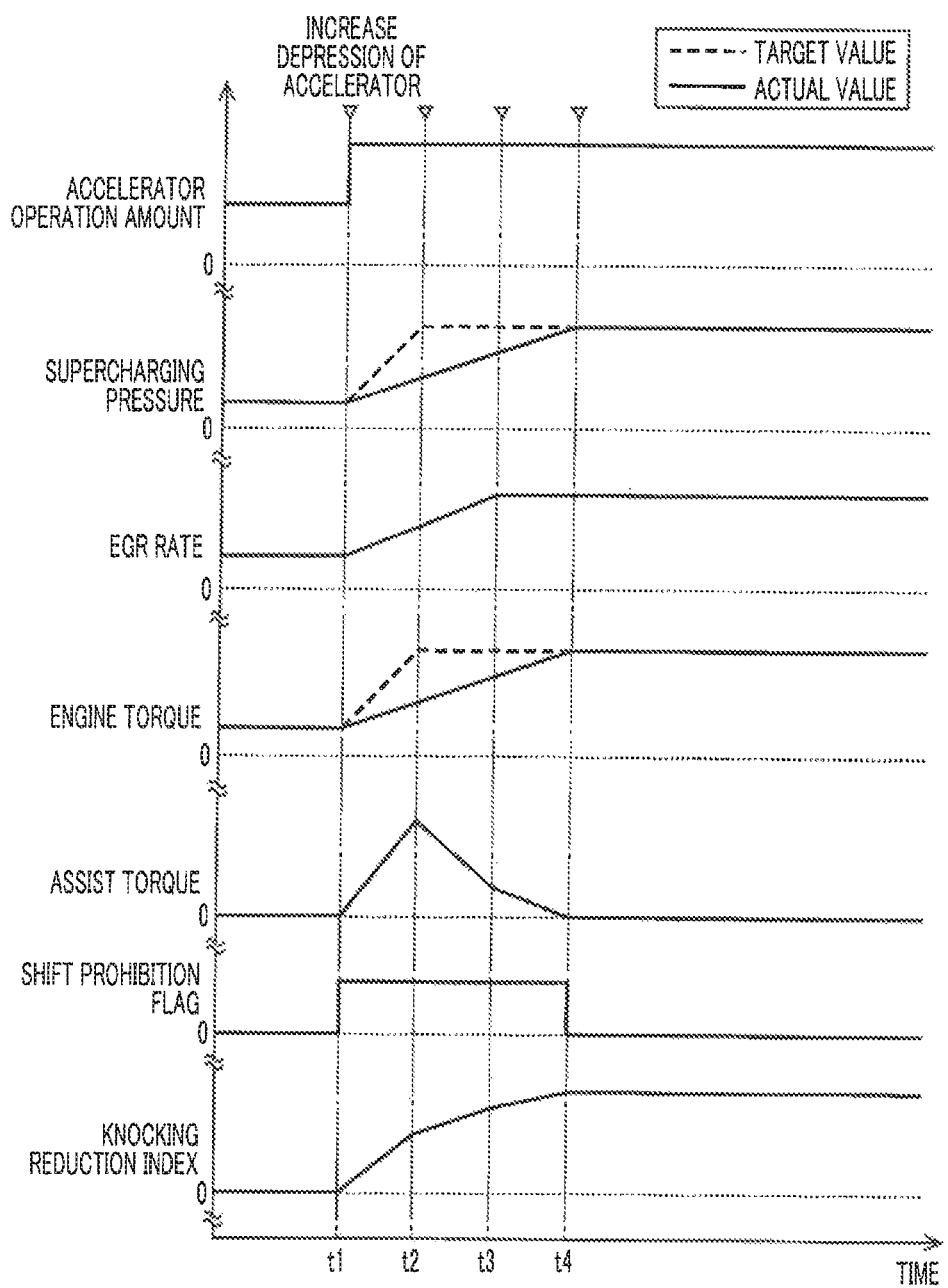
FIG. 12 is a timing chart in the case where the control operations shown in the flowcharts of FIG. 10 and FIG. 11 are executed, and is an example at the time of an increase in the required output of the HCCI engine.

FIG. 10 is a flowchart that illustrates a relevant portion of control operations of the electronic control unit 100, that is, control operations for appropriately dealing with a delay in response at the time of changing the supercharging pressure Pchg in achieving the required power of the HCCI engine 12. This flowchart is repeatedly executed, for example, when the required power of the HCCI engine 12 changes. FIG. 11 is a flowchart that illustrates a relevant portion of control operations of the electronic control unit 100, that is, control operations for appropriately dealing with a delay in response at the time of changing the supercharging pressure Pchg in achieving the required power of the HCCI engine 12. This flowchart is repeatedly executed in parallel with the flowchart of FIG. 10. FIG. 12 is a timing chart in the case where the control operations shown in the flowcharts of FIG. 10 and FIG. 11 are executed, and shows an example at the time of increasing the required power of the HCCI engine 12.

In FIG. 10, initially, in step (hereinafter, step is omitted) S10 corresponding to the function of the output compensation control unit 108, an actual supercharging pressure Pchg is acquired. An EGR amount is calculated on the basis of a valve opening degree command to the actuator of the EGR valve 82v, and an actual EGR rate is acquired on the basis of the EGR amount and an intake air amount Qair. Subsequently, in S20 corresponding to the function of the output compensation control unit 108, at the time of increasing the required power of the HCCI engine 12, a fuel injectable amount at which no knocking occurs at the actual supercharging pressure Pchg and actual EGR rate acquired in S10 is calculated. At the time of reducing the required power of the HCCI engine 12, a fuel injectable amount at which no misfire occurs at the acquired actual supercharging pressure Pchg and actual EGR rate is calculated. Subsequently, in S30 corresponding to the function of the output compensation control unit 108, a possible power of the HCCI engine 12 is calculated on the basis of the fuel injectable amount calculated in S20, and a power difference between the required power of the HCCI engine 12 and the possible power (=Required power−Possible power) is calculated. Subsequently, in S40 corresponding to the function of the output compensation control unit 108, it is determined whether the absolute value of the power difference (|Power difference|) calculated in S30 is larger than the predetermined value. When affirmative determination is made in S40, it is determined in S50 corresponding to the function of the output compensation control unit 108 whether a change in the required power of the HCCI engine 12 is caused by a driver's request or a request from the hybrid system. When negative determination is made in S40 or when negative determination is made in S50, a rotary machine compensation power that is generated by the second electric rotary machine MG2 is set to zero in S60 corresponding to the function of the output compensation control unit 108. When affirmative determination is made in S50, at the time of increasing the required power of the HCCI engine 12, the minimum value of the supercharging pressure Pchg at which knocking is avoided or reduced at the time when the required power is achieved is set for the target supercharging pressure Pchgtgt in S70 corresponding to the functions of the supercharging pressure calculation unit 106 and target EGR rate calculation unit 109. At the time of reducing the required power of the HCCI engine 12, a supercharging pressure Pchg at which a misfire is avoided or reduced at the time when the required power is achieved is set for the target supercharging pressure Pchgtgt. When the EGR amount is allowed to be changed, additionally, an EGR variation amount in process of changing the supercharging pressure Pchg to the target supercharging pressure Pchgtgt is calculated on the basis of the operation status of the HCCI engine 12, and an EGR rate calculated on the basis of the EGR variation amount is set for the target EGR rate. Subsequently, in S80 corresponding to the function of the output compensation control unit 108, a rotary machine compensation power as compensation for part or all of the differential output ΔPe between the required power of the HCCI engine 12 and an actual engine power Pe in process of changing the supercharging pressure Pchg to the target supercharging pressure Pchgtgt (=Required power−Actual engine power Pe) with the MG2 power Pmg2 is calculated. In S90 corresponding to the function of the hybrid control unit 102 subsequent to S60, the fuel injection amount, and the like, are controlled such that the required power is achieved. At this time, the supercharging pressure Pchg is changed to such an extent that the necessity to perform compensation with the use of the second electric rotary machine MG2 is small. Alternatively, in S90 corresponding to the functions of the hybrid control unit 102 and output compensation control unit 108 subsequent to S80, at the time of increasing the required power of the HCCI engine 12, the engine power Pe is controlled within the range in which knocking is avoided or reduced at the actual supercharging pressure Pchg in process of increasing the actual supercharging pressure Pchg to the target supercharging pressure Pchgtgt and the actual EGR rate in process of changing the actual EGR rate to the target EGR rate. At this time, a command to output the rotary machine compensation power calculated in S80 so as to compensate for the required power through motoring of the second electric rotary machine MG2 is output to the power control unit 18. At the time of reducing the requited power of the HCCI engine 12, the engine power Pe is controlled within the range in which a misfire is avoided or reduced at the actual supercharging pressure Pchg in process of reducing the actual supercharging pressure Pchg to the target supercharging pressure Pchgtgt and the actual. EGR rate in process of changing the actual EGR rate to the target EGR rate. At this time, a command to generate the rotary machine compensation power calculated in S80 so as to compensate for the required power through regeneration of the second electric rotary machine MG2 is output to the power control unit 18.

FIG. 11, initially, in S100 corresponding to the function of the output compensation control unit 108, it is determined whether compensation is being performed with the use of the second electric rotary machine MG2. S100 provides the same function of determining whether affirmative determination is made in S40 of FIG. 10. When affirmative determination is made in S100, a shift of the transmission device (the transmission unit 44 and the differential unit 46) of the power transmission system 14 is restricted in S110 corresponding to the functions of the hybrid control unit 102 and power transmission changing unit 104. For example, a shift of the transmission unit 44 is prohibited. A shift of the differential unit 46 is prohibited or a change in the speed ratio of the differential unit 46 is reduced. When negative determination is made in S100, a shift of the power transmission system 14 is not restricted in S120 corresponding to the functions of the hybrid control unit 102 and power transmission changing unit 104.

In FIG. 12, time t1 indicates time at which an operation to increase the depression of an accelerator pedal is performed while the vehicle 10 is traveling in a steady state. Accordingly, the target value of the engine torque Te, corresponding to the required power of the HCCI engine 12, and the target supercharging pressure Pchgtgt, are increased as indicated by dashed lines (see time t1 to time t2). Actually, since there is a delay in response of supercharging, the actual supercharging pressure Pchg increases as indicated by continuous line (see time t1 to time t4). In such a state, if the amount of fuel corresponding to the required power of the HCCI engine 12 is supplied, knocking can occur. For this reason, the actual engine torque Te is increased toward the target value by increasing the fuel injection amount in synchronization with an increase in the actual supercharging pressure Pchg. At this time, the fuel injection amount is increased earlier by increasing the EGR rate such that EGR having a higher response than supercharging is utilized to cover a delay of supercharging (see time t1 to time t3). That is, the HCCI engine 12 is caused to perform HCCI operation at the fuel injection amount that is calculated on the basis of the actual supercharging pressure Pchg and the actual EGR rate, with the result that the engine torque Te indicated by continuous line is obtained (see time t1 to time t4). The actual engine torque Te is insufficient for the target value, so the second electric rotary machine MG2 provides a torque in compensation for an insufficient amount of torque as shown by assist torque (see time t to time t4). Between time t2 and time t4, the target value of the engine torque Te is constant, and the assist torque is reduced. From time t4, EGR and supercharging are sufficiently working (the target value has been reached), and the assist torque is returned to zero. Between time t1 and time t4, compensation with the use of the second electric rotary machine MG2 is being performed, so a shift of the transmission unit 44 is prohibited. The fuel injection amount may be calculated with the use of a knocking reduction index that is calculated on the basis of the actual supercharging pressure Pchg and the actual EGR rate. The knocking reduction index is, for example, an index that indicates the easiness of reducing knocking. As the knocking reduction index increases, knocking is more reduced. The knocking reduction index is increased as the amount of increase in supercharging pressure Pchg or the amount of increase in EGR rate increases.

As described above, according to the present embodiment, although a delay in response occurs at the time of changing the supercharging pressure Pchg, the engine power Pe is controlled toward the required power in accordance with the actual supercharging pressure Pchg in process of changing the actual supercharging pressure Pchg to the target supercharging pressure Pchgtgt that satisfies the predetermined requirement at the time when the HCCI engine 12 performs HCCI operation. Therefore, in comparison with the case where the engine power Pe is changed toward the required power without consideration of a delay in response of the supercharging pressure Pchg, the HCCI engine 12 is placed in an operating state where knocking, a misfire, or the like, is difficult to occur. In addition, since the MG2 power Pmg2 compensates for part or all of the differential output ΔPe between the required power of the HCCI engine 12 and the actual engine power Pe in process of changing the actual supercharging pressure Pchg to the target supercharging pressure Pchgtgt, the required power is easy to be achieved with the use of the HCCI engine 12 and the second electric rotary machine MG2. Thus, in achieving the required power of the HCCI engine 12, it is possible to appropriately deal with a delay in response at the time of changing the supercharging pressure Pchg.

According to the present embodiment, the predetermined requirement is a requirement for reducing knocking associated with an increase in the output of the HCCI engine 12 at the time when the HCCI engine 12 is caused to perform HCCI operation. Therefore, the HCCI engine 12 is placed in an operating state where knocking is easy to occur as a result of an attempt to increase the engine power Pe in order to achieve the required power of the HCCI engine 12 in a state where there is a delay in response to the target supercharging pressure Pchgtgt that satisfies the predetermined requirement. Since the engine power Pe is controlled toward the required power in accordance with the actual supercharging pressure Pchg in process of changing the actual supercharging pressure Pchg to the target supercharging pressure Pchgtgt, the HCCI engine 12 is placed in an operating state where knocking is difficult to occur.

According to the present embodiment, the predetermined requirement is a requirement for reducing a misfire associated with a reduction in the output of the HCCI engine 12 at the time when the HCCI engine 12 is caused to perform HCCI operation. Therefore, the HCCI engine 12 is placed in an operating state where a misfire is easy to occur due to an excessive amount of air as a result of an attempt to reduce the engine power Pe in order to achieve the required power of the HCCI engine 12 in a state where there is a delay in response to the target supercharging pressure Pchgtgt that satisfies the predetermined requirement. Since the engine power Pe is controlled toward the required power in accordance with the actual supercharging pressure Pchg in process of changing the actual supercharging pressure Pchg to the target supercharging pressure Pchgtgt, the HCCI engine 12 is placed in an operating state where a misfire is difficult to occur.

According to the present embodiment, since the engine power Pe is controlled toward the required power in accordance with the actual supercharging pressure Pchg and the actual EGR rate that is achieved by the EGR device 82, the EGR rate having a higher response than the supercharging pressure Pchg is changed while the HCCI engine 12 is placed in an operating state where knocking, a misfire, or the like, is difficult to occur, so it is possible to change the engine power Pe toward the required power earlier. Thus, it is possible to reduce the MG2 power Pmg2 in compensation, so consumption of electric power is reduced.

According to the present embodiment, the MG2 power Pmg2 compensates for the differential output ΔPe at the time when the required power of the HCCI engine 12 is changed as a result of a change in the required driving power through driver's operation, so it is possible to reduce a feeling of strangeness that is experienced by the driver.

According to the present embodiment, the MG2 power Pmg2 compensates for the differential output ΔPe at the time when the required power of the HCCI engine 12 is changed as a result of a change of a request from the hybrid system, so it is possible to reduce a feeling of strangeness that is experienced by the driver.

According to the present embodiment, at the time when the required power of the HCCI engine 12 is increased in response to a request to charge the battery unit 20, the MG2 power Pmg2 compensates for an insufficient amount of output, which is the differential output ΔPe, so it is possible to reduce a feeling of strangeness that is experienced by the driver.

According to the present embodiment, when the MG2 power Pmg2 compensates for the differential output ΔPe, a shift of the transmission device (the transmission unit 44 and the differential unit 46) of the power transmission system 14 is restricted, so it is possible to cause the second electric rotary machine MG2 to operate within an outputtable range.

The embodiment of the present disclosure is described in detail with reference to the accompanying drawings; however, the present disclosure is applicable to other embodiments.

For example, in the above-described embodiment, at the time of implementing the control function during the transition in which the required power of the HCCI engine 12 is changed. EGR is utilized; however, the present disclosure is not limited to this configuration. For example, EGR does not need to be utilized. In this case, in S70 in the flowchart of FIG. 10, a target EGR rate is not calculated. At the time when the required power of the HCCI engine 12 is changed, control for using the MG2 power Pmg2 to uniformly compensate for the differential output ΔPe may be executed. In this case, S50 in the flowchart of FIG. 10 does not need to be executed.

In the above-described embodiment, the embodiment deals with the case at the time of increasing the required power of the HCCI engine 12 and the case at the time of reducing the required power of the HCCI engine 12; however, the present disclosure is not limited to this configuration. For example, an embodiment may deal with only the case at the time of increasing the required power of the HCCI engine 12 or an embodiment may deal with only the case at the time of reducing the required power of the HCCI engine 12.

In the above-described embodiment, the vehicle 10 includes the transmission unit 44 and the differential unit 46; however, the present disclosure is not limited to this configuration. In short, as long as a vehicle includes the HCCI engine 12, the supercharger 64, a power transmission system that transmits the power of the HCCI engine 12 to the drive wheels 16, and a rotary machine coupled to the drive wheels 16 such that power is transmittable, the present disclosure is applicable. The transmission device provided between the HCCI engine 12 and the second electric rotary machine MG2 is the differential unit 46 or the transmission unit 44. However, the transmission device just needs to have a shift function. The present disclosure is described with reference to the power transmission system 14 that is suitably used for the FF vehicle 10; however, the present disclosure is also applicable to a power transmission system that is used for a vehicle of another system, such as an RR system. The electronic control unit 100 may be configured as a plurality of electronic control units that are respectively responsible for individual controls.

The above-described embodiment is only illustrative, and may be implemented in modes including various modifications or improvements on the basis of the knowledge of persons skilled in the art.

What is claimed is:

1. A control system for a vehicle, the vehicle including an internal combustion engine, a supercharger, a power transmission system, and a rotary Machine, the internal combustion engine being configured to perform homogeneous charge compression ignition operation, the supercharger being configured to supercharge intake air into the internal combustion engine, the power transmission system being configured to transmit a power of the internal combustion engine to a drive wheel of the vehicle, the rotary machine coupled to the drive wheel so as to transmit a power to the drive wheel, the control system comprising:
   an electronic control unit configured to
      i) calculate a target supercharging pressure of the intake air such that, when the internal combustion engine is operated through the homogeneous charge compression ignition, the internal combustion engine achieves a required output of the internal combustion engine while satisfying a predetermined requirement,
      ii) control an output of the internal combustion engine such that the output of the internal combustion engine approaches the required output in accordance with an actual supercharging pressure in process of changing the actual supercharging pressure to the target supercharging pressure that is achieved by the supercharger, and
      iii) control the rotary machine such that an output of the rotary machine compensates for part or all of a differential output between the required output and the output of the internal combustion engine in process of changing the actual supercharging pressure to the target supercharging pressure.

2. The control system according to claim 1, wherein the electronic control unit is configured to control the output of the internal combustion engine such that the output of the internal combustion engine approaches the required output while the predetermined requirement is satisfied in accordance with the actual supercharging pressure in process of changing the actual supercharging pressure to the target supercharging pressure that is achieved by the supercharger.

3. The control system according to claim 1, wherein the electronic control unit is configured to control a fuel injection amount of the internal combustion engine such that the output of the internal combustion engine approaches the required output while the predetermined requirement is satisfied in accordance with the actual supercharging pressure in process of changing the actual supercharging pressure to the target supercharging pressure that is achieved by the supercharger.

4. The control system according to claim 1, wherein the predetermined requirement is a requirement for reducing knocking associated with an increase in the output of the internal combustion engine at a time when the internal combustion engine is operated through the homogeneous charge compression ignition.

5. The control system according to claim 1, wherein the predetermined requirement is a requirement for reducing a misfire associated with a reduction in the output of the internal combustion engine at a time when the internal combustion engine is operated through the homogeneous charge compression ignition.

6. The control system according to claim 1, wherein
   the vehicle includes an exhaust gas recirculation device configured to recirculate part of exhaust gas, flowing through an exhaust passage of the internal combustion engine, to an intake passage of the internal combustion engine, the electronic control unit is configured to calculate a target exhaust gas recirculation rate of the exhaust gas recirculation device on the basis of the target supercharging pressure, and the electronic control unit is configured to control the output of the internal combustion engine such that the output of the internal combustion engine approaches the required output in accordance with the actual supercharging pressure and an actual exhaust gas recirculation rate in process of changing the actual exhaust gas recirculation rate to the target exhaust gas recirculation rate that is achieved by the exhaust gas recirculation device.

7. The control system according to claim 1, wherein the electronic control unit is configured to, at a time when the required output of the internal combustion engine is changed as a result of a change in required driving output of the vehicle through driver's operation, control the rotary machine such that the output of the rotary machine compensates for the differential output between the required output and the output of the internal combustion engine.

8. The control system according to claim 1, wherein the electronic control unit is configured to, at a time when the required output of the internal combustion engine is changed as a result of a change of a request from a hybrid system regarding an operation of the internal combustion engine, control the rotary machine such that the output of the rotary machine compensates for the differential output between the required output and the output of the internal combustion engine.

9. The control system according to claim 8, wherein
the vehicle includes an electrical storage device configured to exchange electric power with the rotary machine, and
the request from the hybrid system regarding the operation of the internal combustion engine is a request to charge the electrical storage device.

10. The control system according to claim 1, wherein
the power transmission system includes a transmission device that is provided between the internal combustion engine and the rotary machine and that has a shift function,
the electronic control unit is configured to control a shift of the transmission device, and
the electronic control unit is configured to, when the output of the rotary machine compensates for the differential output, restrict a shift of the transmission device.

* * * * *